(12) United States Patent
Anthony et al.

(10) Patent No.: US 11,812,885 B2
(45) Date of Patent: *Nov. 14, 2023

(54) AUTOMATIC COFFEE MAKER AND METHOD OF PREPARING A BREWED BEVERAGE

(71) Applicant: SharkNinja Operating LLC, Needham, MA (US)

(72) Inventors: Joshua D. Anthony, Billerica, MA (US); Justin Riley, Medway, MA (US); Darwin Keith-Lucas, Arlington, MA (US)

(73) Assignee: SharkNinja Operating LLC, Needham, MA (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/347,727

(22) Filed: Jun. 15, 2021

(65) Prior Publication Data

US 2022/0000303 A1 Jan. 6, 2022

Related U.S. Application Data

(63) Continuation of application No. 14/568,471, filed on Dec. 12, 2014, now Pat. No. 11,051,649, which is a
(Continued)

(51) Int. Cl.
*A47J 31/00* (2006.01)
*A23F 5/26* (2006.01)
(Continued)

(52) U.S. Cl.
CPC ............. *A47J 31/002* (2013.01); *A23F 5/262* (2013.01); *A47J 31/40* (2013.01); *A47J 31/402* (2013.01);
(Continued)

(58) Field of Classification Search
CPC ........ A47J 31/002; A47J 31/40; A47J 31/401; A47J 31/402; A47J 31/52; A47J 31/5253; A47J 31/5255; A47J 31/525
(Continued)

(56) References Cited

U.S. PATENT DOCUMENTS 3,011,426 A 12/1961 Mueller
4,100,394 A 7/1978 Tilp
(Continued)

FOREIGN PATENT DOCUMENTS

DE 4338173 A1 6/1994
EP 0093366 A1 11/1983
(Continued)

OTHER PUBLICATIONS

Machine translation of JPS60142817 performed on Mar. 17, 2023.*
(Continued)

*Primary Examiner* — Tu B Hoang
*Assistant Examiner* — Alba T Rosario-Aponte
(74) *Attorney, Agent, or Firm* — MINTZ LEVIN COHN FERRIS GLOVSKY AND POPEO, PC

(57) ABSTRACT

An automated beverage brewing apparatus is provided including a controller for identifying a volume of bloom water and a bloom time for preparing a brewed beverage. A user interface provides at least one input to the controller. The controller is configured to vary the volume of the bloom water based on a type of brewed beverage and a size of brewed beverage input via the user interface.

19 Claims, 15 Drawing Sheets

Related U.S. Application Data continuation-in-part of application No. 14/307,289, filed on Jun. 17, 2014, now Pat. No. 10,028,615.

(51) Int. Cl.
  *A47J 31/40* (2006.01)
  *A47J 31/52* (2006.01)

(52) U.S. Cl.
  CPC ............ *A47J 31/52* (2013.01); *A47J 31/525* (2018.08); *A47J 31/5253* (2018.08); *A47J 31/5255* (2018.08)

(58) Field of Classification Search
  USPC ..... 99/279, 280, 282, 283, 286, 289 R, 295; 426/433
  See application file for complete search history.

(56) References Cited

U.S. PATENT DOCUMENTS

| | | | |
|---|---|---|---|
| 4,208,957 | A | 6/1980 | Bollman et al. |
| 4,468,406 | A * | 8/1984 | d'Alayer de Costemore d'Arc ... A47J 31/002 426/433 |
| 4,484,515 | A | 11/1984 | Illy |
| 4,651,632 | A | 3/1987 | Motsch |
| 4,728,005 | A | 3/1988 | Jacobs et al. |
| 4,944,217 | A | 7/1990 | Watanabe |
| 4,969,392 | A | 11/1990 | Steele et al. |
| 5,115,730 | A | 5/1992 | Goeckelmann |
| 5,168,794 | A | 12/1992 | Glucksman |
| 5,230,278 | A | 7/1993 | Bunn et al. |
| D346,298 | S | 4/1994 | Brady et al. |
| 5,325,765 | A | 7/1994 | Sylvan et al. |
| 5,372,061 | A | 12/1994 | Albert et al. |
| 5,388,501 | A | 2/1995 | Hazan et al. |
| D356,712 | S | 3/1995 | Brady |
| 5,503,060 | A | 4/1996 | Morecroft et al. |
| D371,270 | S | 7/1996 | Bell et al. |
| D373,281 | S | 9/1996 | Simmons |
| 5,611,262 | A | 3/1997 | Rizzuto et al. |
| D378,970 | S | 4/1997 | Brady et al. |
| D379,132 | S | 5/1997 | Brady et al. |
| 5,840,189 | A | 11/1998 | Sylvan et al. |
| 5,865,095 | A | 2/1999 | Mulle |
| D408,679 | S | 4/1999 | Britt et al. |
| 5,992,026 | A | 11/1999 | Hlava |
| 6,009,793 | A | 1/2000 | Blankenship et al. |
| 6,079,315 | A | 6/2000 | Beaulieu et al. |
| 6,095,031 | A | 8/2000 | Warne |
| D432,848 | S | 10/2000 | Brady et al. |
| D432,849 | S | 10/2000 | Brady et al. |
| 6,142,063 | A | 11/2000 | Beaulieu et al. |
| 6,148,717 | A | 11/2000 | Lassota |
| 6,182,554 | B1 | 2/2001 | Beaulieu et al. |
| D439,103 | S | 3/2001 | Cruz |
| D442,012 | S | 5/2001 | Haring et al. |
| D446,080 | S | 8/2001 | Cruz |
| D446,989 | S | 8/2001 | Cruz |
| 6,283,013 | B1 | 9/2001 | Romandy et al. |
| D453,656 | S | 2/2002 | Byler et al. |
| D457,375 | S | 5/2002 | Picozza et al. |
| 6,440,256 | B1 | 8/2002 | Gordon et al. |
| D462,226 | S | 9/2002 | Williamson et al. |
| D462,865 | S | 9/2002 | Honan et al. |
| 6,557,584 | B1 | 5/2003 | Lucas et al. |
| 6,564,975 | B1 | 5/2003 | Garman |
| 6,565,906 | B1 | 5/2003 | Lassota |
| 6,571,686 | B1 | 6/2003 | Riley et al. |
| 6,576,282 | B1 | 6/2003 | Lassota |
| D477,175 | S | 7/2003 | Smith |
| 6,586,710 | B2 | 7/2003 | Williamson |
| D478,242 | S | 8/2003 | Garman |
| 6,606,938 | B2 | 8/2003 | Taylor |
| 6,644,173 | B2 | 11/2003 | Lazaris et al. |
| 6,655,260 | B2 | 12/2003 | Lazaris et al. |
| 6,658,989 | B2 | 12/2003 | Sweeney et al. |
| 6,666,130 | B2 | 12/2003 | Taylor et al. |
| 6,672,200 | B2 | 1/2004 | Duffy et al. |
| 6,681,960 | B2 | 1/2004 | Garman |
| 6,708,600 | B2 | 3/2004 | Winkler et al. |
| D489,215 | S | 5/2004 | Honan et al. |
| 6,752,069 | B1 | 6/2004 | Burke et al. |
| 6,827,004 | B2 | 12/2004 | Hammad et al. |
| D513,572 | S | 1/2006 | Schaffeld et al. |
| D514,865 | S | 2/2006 | Steiner |
| D514,866 | S | 2/2006 | Brady |
| D514,867 | S | 2/2006 | Steiner |
| 7,013,795 | B2 | 3/2006 | Mulle et al. |
| D526,523 | S | 8/2006 | Steiner et al. |
| D531,855 | S | 11/2006 | Steiner et al. |
| 7,131,369 | B2 | 11/2006 | Gantt et al. |
| 7,165,488 | B2 | 1/2007 | Bragg et al. |
| D543,770 | S | 6/2007 | Ye |
| D544,299 | S | 6/2007 | Schaffeld et al. |
| D549,520 | S | 8/2007 | Brady et al. |
| 7,279,190 | B1 * | 10/2007 | Lassota ................. A47J 31/402 426/597 |
| D556,495 | S | 12/2007 | Davenport |
| D558,506 | S | 1/2008 | Garman |
| 7,337,704 | B2 | 3/2008 | Hammad et al. |
| 7,347,138 | B2 | 3/2008 | Bragg et al. |
| 7,360,418 | B2 | 4/2008 | Pelovitz |
| 7,377,162 | B2 | 5/2008 | Lazaris |
| D570,149 | S | 6/2008 | Truong |
| D572,965 | S | 7/2008 | Steiner |
| 7,398,726 | B2 | 7/2008 | Streeter et al. |
| D575,977 | S | 9/2008 | Rose |
| D582,714 | S | 12/2008 | Hensel |
| 7,461,586 | B2 | 12/2008 | Garman et al. |
| 7,503,253 | B2 | 3/2009 | Rahn |
| 7,513,192 | B2 | 4/2009 | Sullivan et al. |
| 7,523,695 | B2 | 4/2009 | Streeter et al. |
| D593,354 | S | 6/2009 | Romandy |
| D593,356 | S | 6/2009 | Grassia |
| 7,540,232 | B2 | 6/2009 | Bates et al. |
| 7,543,528 | B2 | 6/2009 | Garman |
| D597,368 | S | 8/2009 | Steiner |
| D600,493 | S | 9/2009 | Pino et al. |
| D602,301 | S | 10/2009 | Romandy |
| 7,637,204 | B2 | 12/2009 | Sumser et al. |
| 7,640,845 | B2 | 1/2010 | Woodnorth et al. |
| 7,640,846 | B2 | 1/2010 | Williamson et al. |
| 7,644,653 | B2 | 1/2010 | Bates |
| 7,677,157 | B2 | 3/2010 | Steiner et al. |
| 7,677,158 | B2 | 3/2010 | Mcduffie et al. |
| 7,730,829 | B2 | 6/2010 | Hammad |
| D619,409 | S | 7/2010 | Pino et al. |
| D619,410 | S | 7/2010 | Pino et al. |
| D620,302 | S | 7/2010 | Picozza et al. |
| D622,999 | S | 9/2010 | Murauyou et al. |
| D623,000 | S | 9/2010 | Murauyou et al. |
| D625,542 | S | 10/2010 | Picozza et al. |
| D627,186 | S | 11/2010 | Romandy |
| 7,836,820 | B2 | 11/2010 | Hammad |
| D634,962 | S | 3/2011 | Butler |
| D634,963 | S | 3/2011 | Romandy |
| D637,484 | S | 5/2011 | Winkler |
| 7,997,187 | B2 | 8/2011 | Garman et al. |
| D647,398 | S | 10/2011 | Winkler |
| D647,399 | S | 10/2011 | Winkler |
| D649,826 | S | 12/2011 | Garman |
| 8,075,935 | B2 | 12/2011 | Kreutzer et al. |
| D654,755 | S | 2/2012 | Gresko |
| 8,151,694 | B2 | 4/2012 | Jacobs et al. |
| D660,072 | S | 5/2012 | Makhanlall et al. |
| 8,201,491 | B2 | 6/2012 | Garman |
| D662,756 | S | 7/2012 | Steiner et al. |
| 8,225,708 | B2 | 7/2012 | Lassota et al. |
| D670,539 | S | 11/2012 | Starr et al. |
| D670,540 | S | 11/2012 | Starr et al. |
| 8,327,753 | B2 | 12/2012 | White et al. |
| 8,361,527 | B2 | 1/2013 | Winkler et al. |
| D675,867 | S | 2/2013 | Starr et al. |

(56) References Cited

U.S. PATENT DOCUMENTS

| | | | |
|---|---|---|---|
| 8,393,975 B2 | 3/2013 | Widanagamage | |
| 8,438,968 B2 | 5/2013 | Warner | |
| D685,600 S | 7/2013 | White | |
| D686,033 S | 7/2013 | Burton et al. | |
| 8,495,949 B2 | 7/2013 | Tinkler et al. | |
| 8,495,950 B2 | 7/2013 | Fedele et al. | |
| 8,516,948 B2 | 8/2013 | Zimmerman et al. | |
| 8,573,114 B2 | 11/2013 | Huang et al. | |
| 8,573,115 B2 | 11/2013 | Lai et al. | |
| 8,590,445 B2 | 11/2013 | Garman | |
| 8,609,170 B2 | 12/2013 | Tinkler et al. | |
| 8,635,946 B2 | 1/2014 | White et al. | |
| 8,646,379 B2 | 2/2014 | Lai et al. | |
| 8,667,892 B2 | 3/2014 | Cominelli et al. | |
| 8,770,094 B2 | 7/2014 | Rithener et al. | |
| 8,800,431 B2 | 8/2014 | Sullivan et al. | |
| D713,668 S | 9/2014 | Metaxatos et al. | |
| 8,863,987 B2 | 10/2014 | Jacobs et al. | |
| 8,877,276 B2 | 11/2014 | Cominelli et al. | |
| 10,028,615 B2 | 7/2018 | Anthony et al. | |
| 11,051,649 B2* | 7/2021 | Anthony | A47J 31/402 |
| 2003/0080107 A1 | 5/2003 | Williamson | |
| 2003/0167928 A1 | 9/2003 | Mulle et al. | |
| 2003/0188801 A1 | 10/2003 | Garman | |
| 2004/0118299 A1 | 6/2004 | Garman et al. | |
| 2004/0177762 A1 | 9/2004 | Gutwein et al. | |
| 2004/0244598 A1 | 12/2004 | Garman | |
| 2005/0051478 A1 | 3/2005 | Karanikos et al. | |
| 2005/0160917 A1* | 7/2005 | Gantt | A47J 31/402 |
| | | | 99/279 |
| 2006/0037481 A1 | 2/2006 | Bicht | |
| 2006/0112832 A1 | 6/2006 | Barraclough et al. | |
| 2006/0174773 A1 | 8/2006 | Taylor | |
| 2006/0180029 A1 | 8/2006 | Bates | |
| 2006/0180030 A1 | 8/2006 | Bates et al. | |
| 2006/0196365 A1 | 9/2006 | Garman | |
| 2006/0278091 A1 | 12/2006 | Rutigliano | |
| 2006/0292012 A1 | 12/2006 | Brudevold et al. | |
| 2007/0056994 A1 | 3/2007 | Woodnorth et al. | |
| 2007/0119308 A1 | 5/2007 | Glucksman et al. | |
| 2007/0157820 A1* | 7/2007 | Bunn | A47J 31/52 |
| | | | 99/275 |
| 2008/0134900 A1 | 6/2008 | Steiner et al. | |
| 2008/0134902 A1 | 6/2008 | Zimmerman et al. | |
| 2008/0190297 A1 | 8/2008 | Gussmann et al. | |
| 2008/0216663 A1 | 9/2008 | Williamson | |
| 2008/0216667 A1 | 9/2008 | Garman et al. | |
| 2009/0031900 A1 | 2/2009 | Barraclough et al. | |
| 2009/0031902 A1 | 2/2009 | White et al. | |
| 2010/0011964 A1 | 1/2010 | Serra et al. | |
| 2010/0024658 A1 | 2/2010 | Jacobs et al. | |
| 2010/0086653 A1 | 4/2010 | Fedele et al. | |
| 2010/0206175 A1 | 8/2010 | White et al. | |
| 2010/0266740 A1 | 10/2010 | Van et al. | |
| 2010/0269703 A1 | 10/2010 | Lin | |
| 2010/0270284 A1 | 10/2010 | Cohen et al. | |
| 2010/0288777 A1 | 11/2010 | White et al. | |
| 2010/0303964 A1 | 12/2010 | Beaulieu et al. | |
| 2011/0076361 A1 | 3/2011 | Peterson et al. | |
| 2011/0189362 A1* | 8/2011 | Denisart | A47J 31/22 |
| | | | 426/433 |
| 2011/0212231 A1* | 9/2011 | Mclaughlin | A47J 31/5253 |
| | | | 99/289 R |
| 2011/0223302 A1 | 9/2011 | Star et al. | |
| 2011/0284574 A1 | 11/2011 | Garman | |
| 2012/0017765 A1* | 1/2012 | Leung | A47J 31/42 |
| | | | 99/286 |
| 2012/0052171 A1 | 3/2012 | Starr et al. | |
| 2012/0100275 A1 | 4/2012 | Bishop et al. | |
| 2012/0121764 A1 | 5/2012 | Lai et al. | |
| 2012/0121768 A1 | 5/2012 | Lai et al. | |
| 2012/0121779 A1 | 5/2012 | Lai et al. | |
| 2012/0121780 A1 | 5/2012 | Lai et al. | |
| 2012/0140590 A1 | 6/2012 | Kirschner | |
| 2012/0171332 A1 | 7/2012 | Lai et al. | |
| 2012/0199008 A1 | 8/2012 | White et al. | |
| 2013/0019903 A1 | 1/2013 | Rizzuto et al. | |
| 2013/0068012 A1 | 3/2013 | Preston et al. | |
| 2013/0087049 A1* | 4/2013 | White | A47J 31/0605 |
| | | | 99/283 |
| 2013/0101716 A1 | 4/2013 | Beaulieu et al. | |
| 2013/0122167 A1 | 5/2013 | Winkler et al. | |
| 2013/0129876 A1 | 5/2013 | Ye et al. | |
| 2013/0133524 A1 | 5/2013 | Vastardis et al. | |
| 2013/0209636 A1 | 8/2013 | Cominelli et al. | |
| 2013/0233950 A1 | 9/2013 | Sandford et al. | |
| 2013/0239817 A1 | 9/2013 | Mulvaney et al. | |
| 2013/0319034 A1 | 12/2013 | Kounlavong et al. | |
| 2013/0337132 A1* | 12/2013 | Fenna | A47J 31/002 |
| | | | 426/433 |
| 2013/0344205 A1* | 12/2013 | Oh | A47J 31/0673 |
| | | | 426/433 |
| 2014/0010934 A1 | 1/2014 | Garman | |
| 2014/0030404 A1 | 1/2014 | Sullivan et al. | |
| 2014/0037808 A1 | 2/2014 | Rizzuto et al. | |
| 2014/0057033 A1 | 2/2014 | Lai et al. | |
| 2014/0069279 A1 | 3/2014 | Upston et al. | |
| 2014/0072689 A1 | 3/2014 | Ho et al. | |
| 2014/0079853 A1 | 3/2014 | Hansen | |
| 2014/0102306 A1 | 4/2014 | White et al. | |
| 2014/0109667 A1 | 4/2014 | White et al. | |
| 2014/0141142 A1 | 5/2014 | Cominelli et al. | |
| 2014/0208952 A1 | 7/2014 | Starr et al. | |
| 2014/0208954 A1 | 7/2014 | Starr et al. | |
| 2014/0242226 A1 | 8/2014 | Buttiker | |
| 2014/0251151 A1 | 9/2014 | Cao et al. | |
| 2014/0261000 A1 | 9/2014 | Weflen | |
| 2014/0261853 A1 | 9/2014 | Carnevale et al. | |
| 2014/0263093 A1 | 9/2014 | Jacobs | |
| 2014/0263398 A1 | 9/2014 | Swerchesky et al. | |
| 2014/0263432 A1 | 9/2014 | Jacobs et al. | |
| 2014/0272023 A1 | 9/2014 | Zimmerman et al. | |
| 2014/0272048 A1 | 9/2014 | Hristov et al. | |
| 2014/0272076 A1 | 9/2014 | Nevin et al. | |
| 2014/0302210 A1 | 10/2014 | Garman | |
| 2014/0314926 A1 | 10/2014 | Hanes et al. | |
| 2014/0318378 A1 | 10/2014 | Ertur et al. | |
| 2015/0017297 A1 | 1/2015 | Vastardis et al. | |
| 2015/0064324 A1 | 3/2015 | Oh | |
| 2015/0282662 A1 | 10/2015 | Levine et al. | |
| 2015/0359374 A1 | 12/2015 | Anthony et al. | |
| 2015/0359378 A1 | 12/2015 | Anthony et al. | |
| 2016/0058233 A1 | 3/2016 | Anthony et al. | |
| 2017/0172340 A1 | 6/2017 | Baarman et al. | |
| 2018/0296027 A1 | 10/2018 | Anthony et al. | |

FOREIGN PATENT DOCUMENTS

| | | | | | |
|---|---|---|---|---|---|
| EP | 0395907 | A1 | | 11/1990 | |
| EP | 2157894 | B1 | | 7/2013 | |
| JP | S60142817 | A | * | 7/1985 | |
| JP | 2006014922 | A | | 1/2006 | |
| WO | 2009032874 | A2 | | 3/2009 | |
| WO | 2011140582 | A1 | | 11/2011 | |
| WO | 2012093269 | A2 | | 7/2012 | |
| WO | WO-2012093269 | A2 | * | 7/2012 | A47J 31/002 |
| WO | WO-2013121438 | A1 | * | 8/2013 | A47J 31/3609 |

OTHER PUBLICATIONS (Mar. 30, 2012) "Breville the YouBrew Instruction Book", Model BDC600XL/A, 35 pages.
Anthony Josh (Sep. 18, 2014) "Brazen Plus Coffee Maker Pre-Soak Time", 1 page.
Extended European Search Report issued in European Application No. 20202835.3, dated Jul. 20, 2021, 8 pages.
(Aug. 18, 2014) "How to Brew Great Coffee: The Pour Over Method", The Kitchn, 4 pages.
International Preliminary Report on Patentability received for PCT Application No. PCT/US15/051507, dated Jun. 22, 2017, 10 pages.

(56) References Cited

OTHER PUBLICATIONS

International Preliminary Report on Patentability received for PCT Application No. PCT/US15/35785, dated Dec. 29, 2016, 10 pages.
International Search Report and Written Opinion received for PCT Application No. PCT/US15/051507, dated Mar. 9, 2016, 14 pages.
Invitation to Pay Additional Fees International Application No. PCT/US2015/051507, dated Oct. 13, 2015, 6 pages.
(Sep. 8, 2014) "What is Coffee Bloom?", CupAndBrew.com, 3 page.
Behmor Inc. (Jul. 11, 2014) "Brazen Plus 8-Cup Programmable Coffee Maker by Behmor Inc.", Operations and Maintenance Guide; www.behmor.com.
Behmor Inc. (Apr. 17, 2012) "The BraZen* Coffee Brewer introduces a revolutionary new vision in coffee brewing—where the user is actually in control of the brewing process", http://www.behmor.com/docs/Behmor-Brazen-Features-Data-4.17.12.pdf, 3 pages.
Clive Coffee,(Aug. 18, 2014) "Ratio Coffee Machine", http://www.clivecoffee.com/product/ratio-coffee-machine.html, 4 pages.
Wikipedia, "Coffeemaker", Wikipedia.org; URL: https://en.wikipedia.org/wiki/coffeemaker; Retrieved Aug. 12, 2019, 7 pages.
Wikipedia, "User interface", Wikipedia.org; URL: https://en.wikipedia.org/wiki/User_interface; Retrieved Aug. 12, 2019, 11 pages.
Geiger Brian, (Mar. 7, 2011) "Making Automatic Drip Coffee Better by Blooming", Fine Cooking, 2pages.
U.S. Appl. No. 14/934,800, filed Nov. 6, 2015, Automatic Coffee Maker and Method of Preparing a Brewed Beverage.
U.S. Appl. No. 14/307,289, filed Jun. 17, 2014, Method of Brewing Coffee.
U.S. Appl. No. 14/568,471, filed Dec. 12, 2014, Automatic Coffee Maker and Method of Preparing a Brewed Beverage.
U.S. Appl. No. 14/812,731, filed Jul. 29, 2015, Automatic Coffee Maker and Method of Preparing a Brewed Beverage.
U.S. Appl. No. 16/014,558, filed Jun. 21, 2018, Automatic Coffee Maker.

* cited by examiner

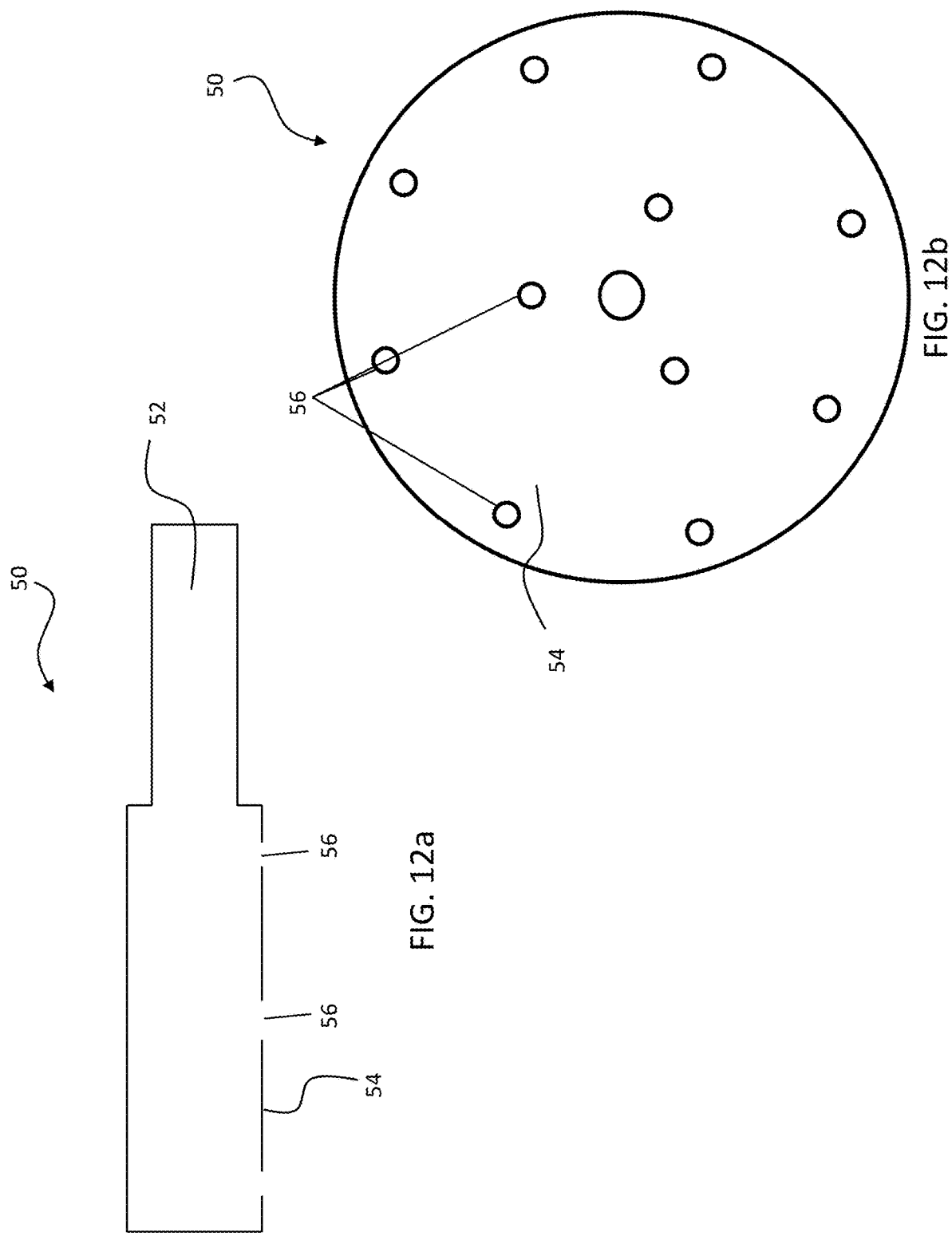

AUTOMATIC COFFEE MAKER AND METHOD OF PREPARING A BREWED BEVERAGE

CROSS-REFERENCE TO RELATED APPLICATIONS

This application is a continuation of and claims the benefit of U.S. patent application Ser. No. 14/568,471 filed on Dec. 12, 2014, which is a continuation in part of and claims the benefit of U.S. patent application Ser. No. 14/307,289 filed Jun. 17, 2014, the entire contents of each of which are incorporated herein by reference.

BACKGROUND

Exemplary embodiments of the present invention relate to a system and method for brewing beverages, and more particularly to a system and method of automatically brewing a beverage having a desired flavor profile.

Various systems and methods for brewing a beverage, such as coffee, are known. Known systems include drip brewing systems in which hot water is filtered through coffee grounds and into a carafe and French press systems in which coffee grounds and hot water are mixed in a container and a water permeable plunger is pressed into the container from above to trap the ground coffee at the bottom of the container.

Accordingly, a beverage brewing system capable of automatically brewing a beverage having a desired flavor profile, regardless of the type or volume of beverage selected, is desirable.

SUMMARY

According to one embodiment of the invention, an automated beverage brewing apparatus is provided including a controller for identifying a volume of bloom water and a bloom time for preparing a brewed beverage. A user interface provides at least one input to the controller. The controller is configured to vary the volume of the bloom water based on a type of brewed beverage and a size of brewed beverage input via the user interface.

In addition to one or more of the features described above, or as an alternative, in further embodiments the automated beverage brewing apparatus is configured to prepare one or more of a regular coffee, a rich coffee, and an ultra-rich coffee.

In addition to one or more of the features described above, or as an alternative, in further embodiments the automated beverage brewing apparatus additionally includes a reservoir configured to hold a volume of water sufficient to prepare a brewed beverage. A brew basket is configured to hold ground coffee and a shower head adjacent the brew basket is configured to evenly distribute water over the ground coffee. A heating mechanism is arranged in fluid communication with the reservoir and the showerhead. The heating mechanism is configured to heat water delivered from the reservoir to the heating mechanism before supplying it to the shower head.

In addition to one or more of the features described above, or as an alternative, in further embodiments the controller is operably coupled to the heating mechanism and is configured to operate the heating mechanism to control a volume of water provided to the ground coffee.

In addition to one or more of the features described above, or as an alternative, in further embodiments the controller is configured to vary the bloom time based on the type of brewed beverage and the size of brewed beverage input via the user interface.

According to another embodiment of the invention, an automated beverage brewing apparatus is provided including a controller for identifying a volume of bloom water and a bloom time for preparing a brewed beverage. A user interface provides at least one input to the controller. The controller is configured to automatically vary the bloom time based on a type of brewed beverage and a size of brewed beverage input via the user interface.

In addition to one or more of the features described above, or as an alternative, in further embodiments the automated beverage brewing apparatus is configured to prepare one or more of a regular coffee, a rich coffee, and an ultra-rich coffee.

According to another embodiment of the invention, an automated beverage brewing apparatus is provided including a user interface configured to allow a user to select one of a plurality of brewed beverages and one of a plurality of sizes. A controller is configured to identify a plurality of parameters for preparing the brewed beverage based on an input signal received from the user interface. A volume of a first brewed beverage is less than a volume of a second brewed beverage for each of the plurality of sizes selectable by a user via the user interface.

In addition to one or more of the features described above, or as an alternative, in further embodiments a flavor profile of the first brewed beverage is different than a flavor profile of the second brewed beverage.

In addition to one or more of the features described above, or as an alternative, in further embodiments a volume of a third brewed beverage is less than a volume of the second brewed beverage for each of the plurality of sizes.

In addition to one or more of the features described above, or as an alternative, in further embodiments a flavor profile of the third brewed beverage is different than the flavor profile of the both the first brewed beverage and the second brewed beverage.

In addition to one or more of the features described above, or as an alternative, in further embodiments the flavor profile of the first brewed beverage includes a percent of total dissolved solids between about 1.15 and about 1.35 and an extraction between about 18% and about 22%, the flavor profile of the second brewed beverage includes a percent of total dissolved solids between about 1.35 and about 1.55 and an extraction between about 18% and about 22%, and the flavor profile of the third brewed beverage includes a percent of total dissolved solids between about 2.30 and about 2.80 and an extraction between about 16% and about 20%.

In addition to one or more of the features described above, or as an alternative, in further embodiments parameters for preparing a brewed beverage include a recommended mass of ground coffee and a volume of bloom water, wherein the mass of ground coffee and the volume of bloom water are substantially identical for a selected size, regardless of which of the plurality of beverages is selected.

In addition to one or more of the features described above, or as an alternative, in further embodiments the first brewed beverage is a regular coffee. Parameters for preparing a regular coffee of a first size includes a mass of ground coffee between about 14-20 g, a volume of bloom water between about 28-41 mL, a bloom time between about 15-30 seconds, and a volume of brew water between about 270-400 mL.

In addition to one or more of the features described above, or as an alternative, in further embodiments parameters for preparing a regular coffee of a second size includes a mass of ground coffee between about 20-30 g, a volume of bloom water between about 40-60 mL, a bloom time between about 15-30 seconds, and a volume of brew water between about 395-591 mL.

In addition to one or more of the features described above, or as an alternative, in further embodiments parameters for preparing regular coffee of a third size includes a mass of ground coffee between about 27-41 g, a volume of bloom water between about 80-120 mL, a bloom time between about 12-18 seconds, and a volume of brew water between about 526-790 mL.

In addition to one or more of the features described above, or as an alternative, in further embodiments parameters for preparing regular coffee of a fourth size includes a mass of ground coffee between about 54-82, a volume of bloom water between about 140-210 mL, a bloom time between about 12-18 seconds, and a volume of brew water between about 1025-1537 mL.

In addition to one or more of the features described above, or as an alternative, in further embodiments the second brewed beverage is a rich coffee. Parameters for preparing a rich coffee of a first size includes a mass of ground coffee between about 14-20 g, a volume of bloom water between about 28-41 mL, a bloom time between about 30-50 seconds, and a volume of brew water between about 235-345 mL.

In addition to one or more of the features described above, or as an alternative, in further embodiments parameters for preparing rich coffee of a second size includes a mass of ground coffee between about 20-30 g, a volume of bloom water between about 40-60 mL, a bloom time between about 30-50 seconds, and a volume of brew water between about 351-527 mL.

In addition to one or more of the features described above, or as an alternative, in further embodiments parameters for preparing rich coffee of a third size includes a mass of ground coffee between about 27-41 g, a volume of bloom water between about 80-120 mL, a bloom time between about 30-50 seconds, and a volume of brew water between about 458-698 mL.

In addition to one or more of the features described above, or as an alternative, in further embodiments parameters for preparing rich coffee of a fourth size includes a mass of ground coffee between about 54-82, a volume of bloom water between about 140-210 mL, a bloom time between about 12-18 seconds, and a volume of brew water between about 919-1379 mL.

In addition to one or more of the features described above, or as an alternative, in further embodiments the third brewed beverage is an ultra-rich coffee. Parameters for preparing an ultra-rich coffee of a first size includes a mass of ground coffee between about 14-20 g, a volume of bloom water between about 28-41 mL, a bloom time between about 30-60 seconds, and a volume of brew water between about 89-133 mL.

In addition to one or more of the features described above, or as an alternative, in further embodiments parameters for preparing an ultra-rich coffee of a second size includes a mass of ground coffee between about 20-30 g, a volume of bloom water between about 40-60 mL, a bloom time between about 30-60 seconds, and a volume of brew water between about 195-293 mL.

In addition to one or more of the features described above, or as an alternative, in further embodiments parameters for preparing an ultra-rich coffee of a third size includes a mass of ground coffee between about 27-41 g, a volume of bloom water between about 80-120 mL, a bloom time between about 30-60 seconds, and a volume of brew water between about 249-373 mL.

In addition to one or more of the features described above, or as an alternative, in further embodiments parameters for preparing an ultra-rich coffee of a fourth size includes a mass of ground coffee between about 54-82, a volume of bloom water between about 140-210 mL, a bloom time between about 12-18 seconds, and a volume of brew water between about 496-745 mL.

In addition to one or more of the features described above, or as an alternative, in further embodiments the beverage brewing apparatus is compatible with a plurality of containers including a mug, a travel mug, a half-carafe, and a carafe, and each container is associated with one of the plurality of sizes.

According to yet another embodiment of the invention, a method of preparing a brewed beverage is provided including determining a size and type of brewed beverage selected via a user interface of a beverage brewing apparatus. A first volume of heated water is delivered to a brew basket containing ground coffee. The ground coffee is wet for a predetermined period of time. A second volume of heater water is delivered to the ground coffee. At least one of the first volume of water, the predetermined period of time, and the second volume of water is dependent on the size and type of brewed beverage selected.

In addition to one or more of the features described above, or as an alternative, in further embodiments the first volume of heated water and the second volume of heated water are delivered by energizing a heating mechanism.

In addition to one or more of the features described above, or as an alternative, in further embodiments a flow meter fluidly coupled to the heating mechanism is configured to determine when the first volume of water and the second volume of water is delivered to the ground coffee.

In addition to one or more of the features described above, or as an alternative, in further embodiments an algorithm is configured to determine an operating time of the heating mechanism to supply the first volume of water and the second volume of water to the ground coffee.

BRIEF DESCRIPTION OF THE FIGURES

The accompanying drawings incorporated in and forming a part of the specification embodies several aspects of the present invention and, together with the description, serves to explain the principles of the invention. In the drawings:

FIG. 12a is a cross-sectional view of a shower head of the beverage brewing apparatus according to an embodiment of the invention;

FIG. 12b is a bottom view of a shower head of the beverage brewing apparatus according to an embodiment of the invention;

The detailed description explains embodiments of the invention, together with advantages and features, by way of example with reference to the drawings.

DETAILED DESCRIPTION

Aspects and embodiments disclosed herein include a system and method for preparing various brewed beverages. Although the invention is described herein with reference to preparing a brewed coffee beverage, preparation of other brewed beverages is within the scope of the invention. As the term is used herein, "coffee" refers to a beverage including solids extracted from coffee beans and dissolved in water. Brewed coffee is typically prepared by passing hot water through dried and ground coffee beans, referred to herein as "ground coffee." Solids from the ground coffee are dissolved in the hot water as it passes there through.

Figure 1:
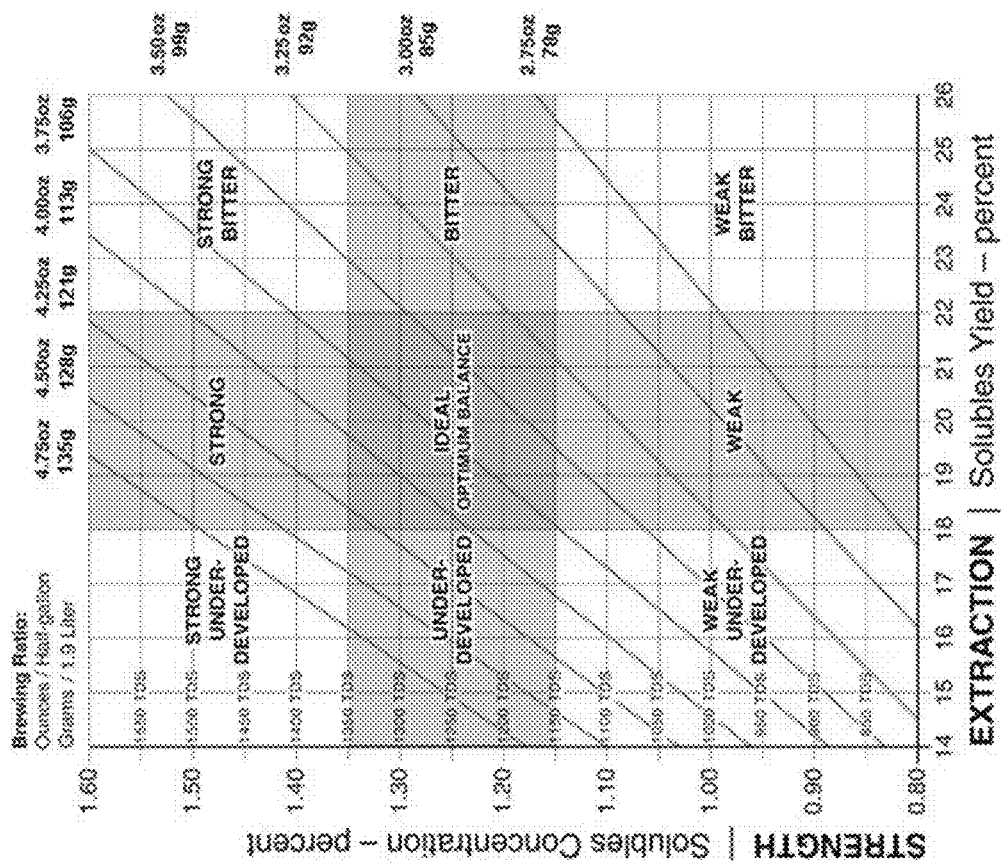
FIG. 1 is a graph representing Strength (% TDS) vs. Extraction (%) of Brewed Coffee.

The flavor profile of brewed coffee is a balance between strength (solubles concentration) and extraction (solubles yield), as shown in FIG. 1. Strength refers to the measured amount of solids extracted into the coffee. Strength is typically expressed as a percentage of total dissolved solids (% TDS). For example, for 100 g of coffee measuring 1.2% TDS, 98.8 g of the coffee is water and 1.2 g is dissolved coffee solids. Extraction, or solubles yield, refers to the percentage of the ground coffee by weight that is removed by dissolving water during the brewing process. Up to 30% of the available soluble solids in ground coffee can be extracted, with most of the remaining 70% being insoluble in water. The solubles yield of brewed coffee is dependent on multiple factors, including, but not limited to, the temperature of the water passed through the ground coffee, the grind size of the ground coffee, and the amount of time that the water is in contact with the ground coffee. For example, ground coffee with a larger grind size may require a higher water temperature or a longer water contact time at a lower temperature to achieve an equivalent amount of soluble extraction as a ground coffee having a smaller grind size.

Over the years, various institutions and committees within the coffee industry have established a "gold cup" standard that coffee having an extraction between about 18% and 22% and a percentage of total dissolved solids between about 1.15 and 1.35 percent will generally yield the best quality of brewed coffee. As shown in the FIG., coffee with an extraction of greater than 22% will have a sharp increase in the soluble components that contribute to the bitter taste associated with over-extraction, and coffee with an extraction of less than 18% is generally associated with sour, under-developed taste.

The amount of water used to brew the coffee should also be controlled to produce a coffee having a pleasant flavor and strength. The strength of the coffee will vary depending on multiple factors including, the ratio of ground coffee to water being used, grind size, and contact time between the coffee grounds and the water for example. In a general application, the use of too much water may result in coffee that is weak, and the use of too little water may result in coffee which is undesirably strong.

The temperature of the water used is also considered an important variable in determining a proper balance and taste. This is because cooler water may not extract a desirable quantity of solubles that make up the flavor of brewed coffee. Similarly, hotter water may extract a higher ratio of bitter solubles than desired. As a result, it is generally desirable to use water for brewing coffee such that temperature in the brewing chamber is between about 195° F. and 205° F. (91° C.-96° C.).

It is known that pre-soaking or wetting the ground coffee with water, such as prior to delivering the majority of the hot water used to brew the coffee, may result in a brewed coffee having a more pleasant taste than brewed coffee produced without pre-soaking the ground coffee. Pre-soaking the ground coffee releases gasses trapped within the coffee grounds, such as carbon dioxide for example. As a result, the portion of the ground coffee configured to evenly absorb and filter the water is increased. The water used for pre-soaking the ground coffee may be referred to herein as "bloom water" and the amount of time that the boom water is exposed to the ground coffee to pre-soak the ground coffee is referred to as "bloom time." The water used to brew the coffee from the ground coffee after the bloom water, will be referred to herein as "brew water." The brew water is delivered to the ground coffee after completion of pre-soaking of the ground coffee with the bloom water for a bloom time. The ratio of the volume of bloom water to the mass of ground coffee, in addition to other factors, also contributes to the production of a balanced, pleasant tasting coffee.

Referring now to FIGS. 2-12, an automated beverage brewing apparatus 20 according to an embodiment of the invention is illustrated in more detail. The apparatus 20 is capable of producing a pleasantly flavored beverage, such as coffee for example, by controlling not only the quantity of water used to brew the coffee, but also the time for which the water is in contact with the ground coffee. The apparatus includes a housing 22, a water reservoir 30, a heating mechanism 44, a shower head 50, and a brew basket 60. The water reservoir 30 is a generally hollow container affixed to a portion of the housing 22. The reservoir 30 is configured to store a desired amount of water therein for brewing a beverage, such as coffee for example, and in some embodiments may be detachable from the housing 22 for ease of use.

Figure 8:
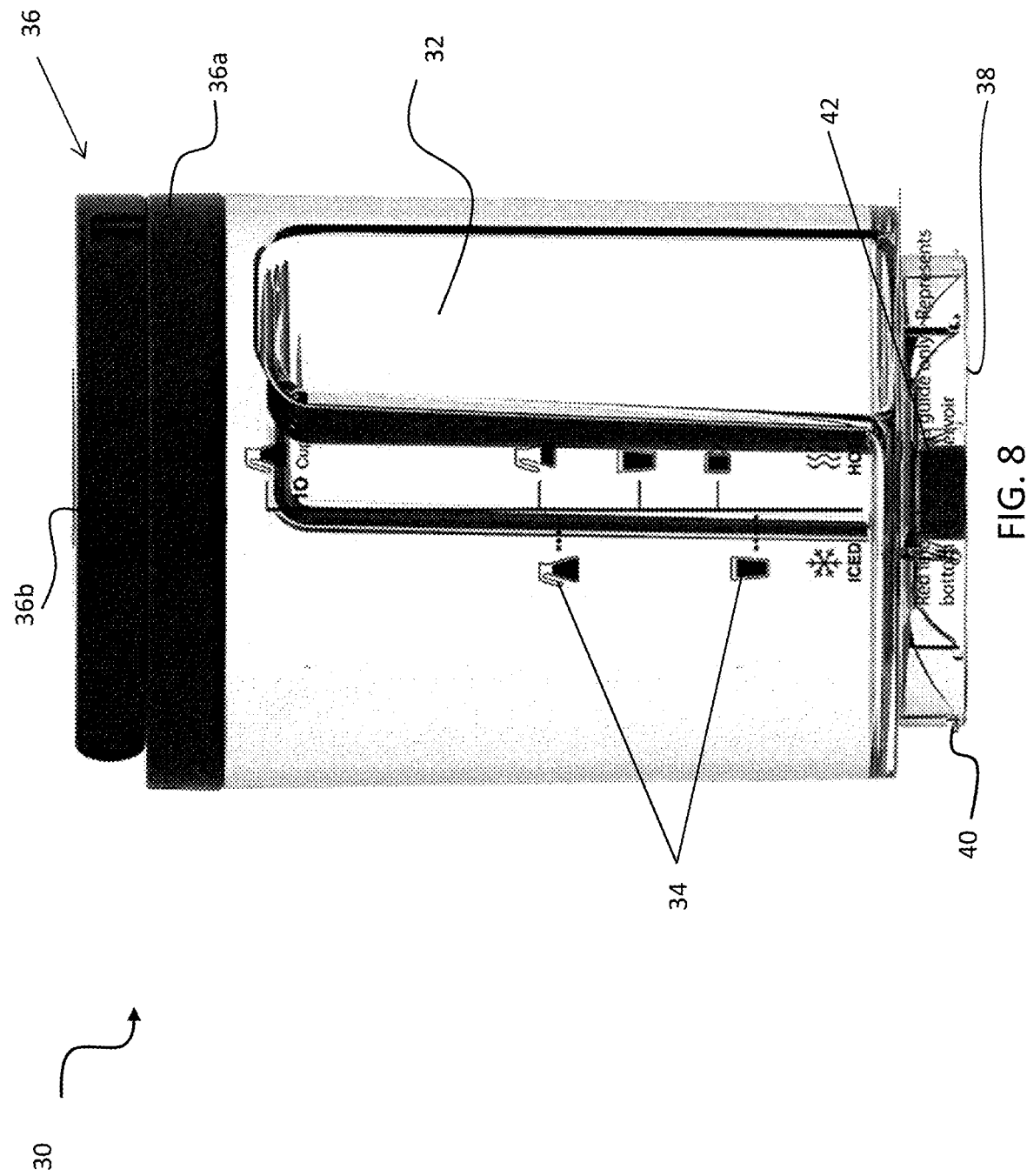
FIG. 8 is a perspective view of a water reservoir of a beverage brewing apparatus according to an embodiment of the invention.
Figure 9:
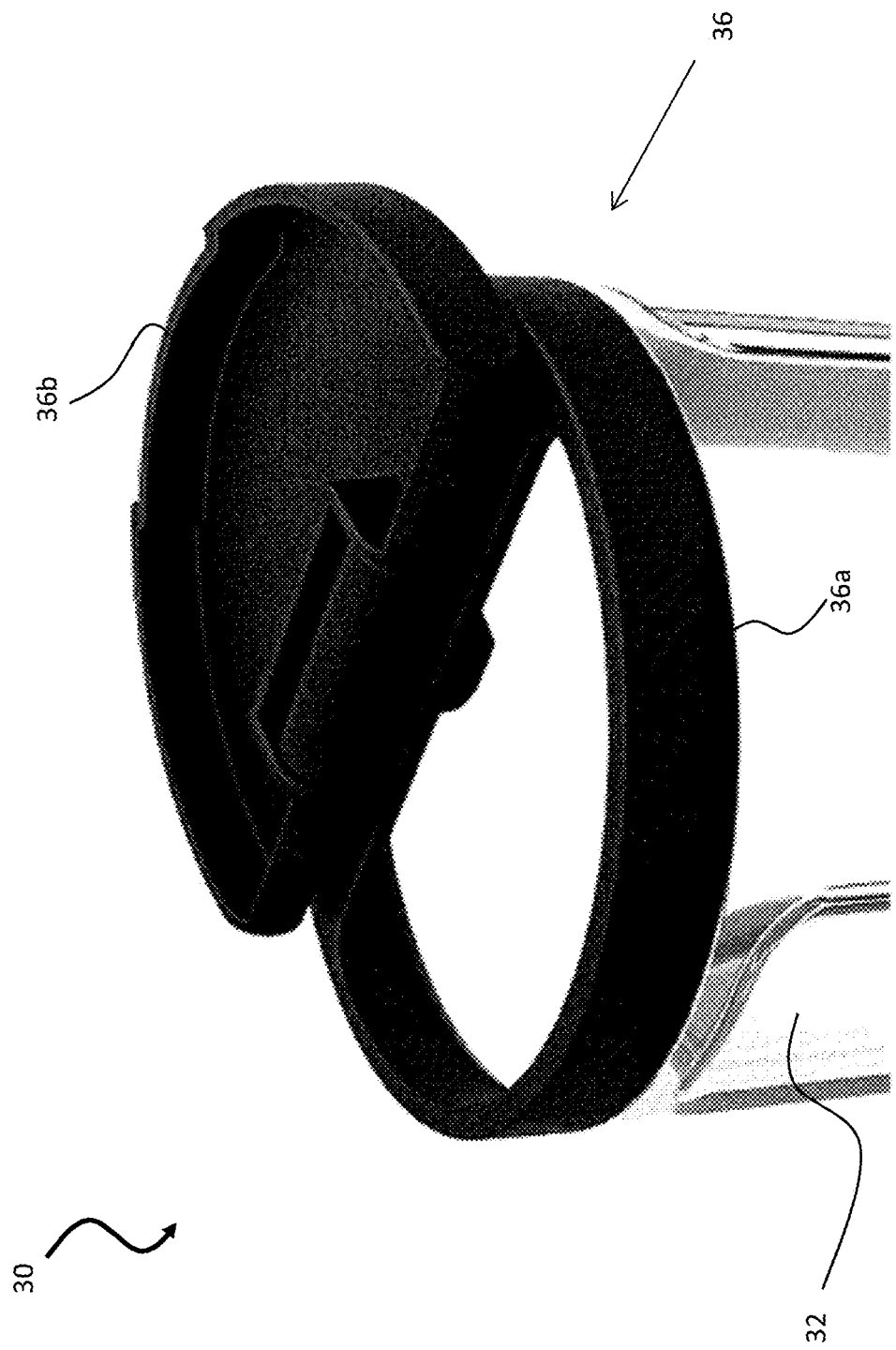
FIG. 9 is a perspective view of a lid of the water reservoir of a FIG. 8 according to an embodiment of the invention.

An example of the water reservoir 30 is illustrated in more detail in FIGS. 8 and 9. In the illustrated, non-limiting embodiment, the reservoir 30 includes one or more contours 32, such as recessed grips for example, to allow a user to transport the water reservoir 30 with one hand. One or more markings 34 may be formed on the reservoir 30 to indicate to a user a sufficient amount of water appropriate for one or more of the selectable brewing sizes. A lid 36 for the reservoir may be integrally formed into the housing 22, or alternatively, may be a separate component, removably attached to the reservoir 30. As shown in FIG. 8, the lid 36 may include a first portion 36a configured to attach, such as by threaded engagement for example, to a portion of the reservoir 30, and a second portion 36b coupled to the first portion 36a and movable between a closed position (FIG. 8) and an open position (FIG. 9) to easily fill the reservoir 30 with water. In one embodiment, the first portion 36a of the lid 36 is movable about 180 degrees between the closed position and the open position.

In one embodiment, an outlet end 38 of the reservoir 30 includes at least one connector 40 configured to slidably engage a plurality of complementary connectors (not shown) arranged within a portion of the housing 22 to lock the reservoir in place. A plug 42 is generally arranged within the opening (not shown) formed at the outlet end 38 of the reservoir 30. When the reservoir 30 is detached from the housing 22, the plug 42 is configured to block a flow of water from the outlet end 38 of the reservoir 30. However, when the reservoir 30 is connected to the housing 22, the plug 42 is configured to move vertically to allow a flow of water through the outlet end 38. In one embodiment, the plug 42 is spring loaded and is biased to the position to block a flow from the reservoir 30. A particulate filter may also be formed within the plug 42 or directly within the opening of the outlet end 38.

The heating mechanism 44, arranged within an interior of the housing 22, is fluidly coupled to the outlet end 38 of the water reservoir 30 via a first conduit 46 and is arranged in fluid communication with the shower head 50 via a second conduit 48. The first conduit 46 and the second conduit 48 may be formed from the same or different food safe materials, such as food grade silicone tubing, stainless steel tubing, or polymeric tubing for example. In one embodiment, the heating mechanism 44 is a boiler and is configured to heat the water from the reservoir 30 before supplying it to the showerhead 50.

The brew basket 60 is removably coupled to the housing 22 at a position vertically below the shower head 50. The brew basket 60 is generally hollow and includes a brew chamber 62 configured to receive ground coffee and to brew the ground coffee when hot water is introduced therein. In one embodiment, the brew chamber 62 is configured to receive a disposable or permanent coffee filter (not shown) in which the ground coffee may be disposed.

From the brew basket 60, the brewed coffee is directed into a vertically adjacent container 80 either directly or through one or more conduits or chambers. Examples of containers 80 configured for use with the beverage brewing apparatus 20, include, but are not limited to, a carafe, a half-carafe, a travel mug, and a mug for example. In one embodiment, the brewed beverage may drip from the outlet end 64 of the brew basket 60 into a straw 84 disposed within the container 80. The straw 84 may include an opening 86 located near a bottom 82 of the container 80 such that the brewed beverage circulates within the container 80 as it fills. In a non-limiting embodiment, the straw 84 includes a single tooth configured to direct the circulation of the brewed beverage in a single direction.

In one embodiment, the housing 22 includes a floor 24 configured to support a container 80 thereon. The floor 24 may be arranged generally adjacent a base 26 of the apparatus and may extend generally parallel to the shower head 50. Alternatively, or in addition, a platform 28 movable between a stored position and a deployed position may be attached to a portion of the housing 22 such that when the platform 28 is in the deployed position, the platform 28 is configured to support a container 80 thereon. In one embodiment, the platform 28 is generally parallel to the floor within about 5° when in the deployed position. By positioning the platform 28 between the floor 24 and the brew basket 60, the platform 28 may be used to support smaller containers, such as a mug or travel mug for example, to limit the distance the brewed beverage drips from the outlet end 64 of the brew basket 60 into the container 80.

Figure 10:
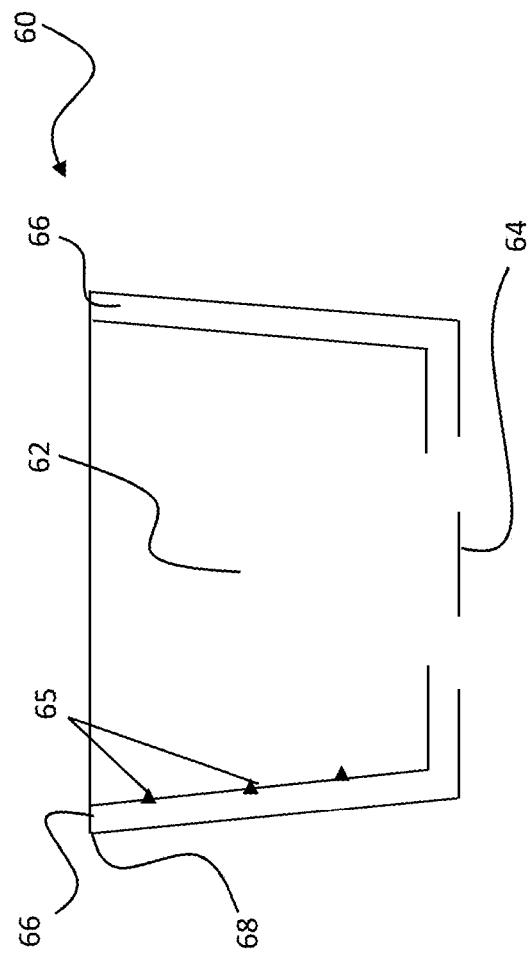
FIG. 10 is a cross-sectional view of a brew basket of the beverage brewing apparatus according to an embodiment of the invention.
Figure 11B:
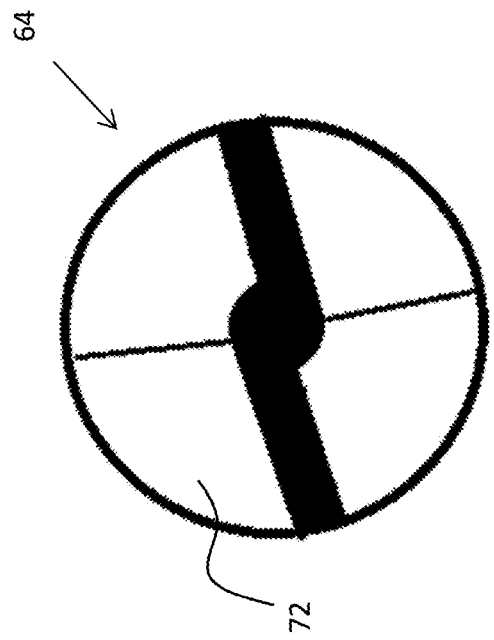
FIG. 11b is a bottom view of a brew basket of the beverage brewing apparatus when a drip stop assembly is in a second position according to an embodiment of the invention.
Figure 11A:
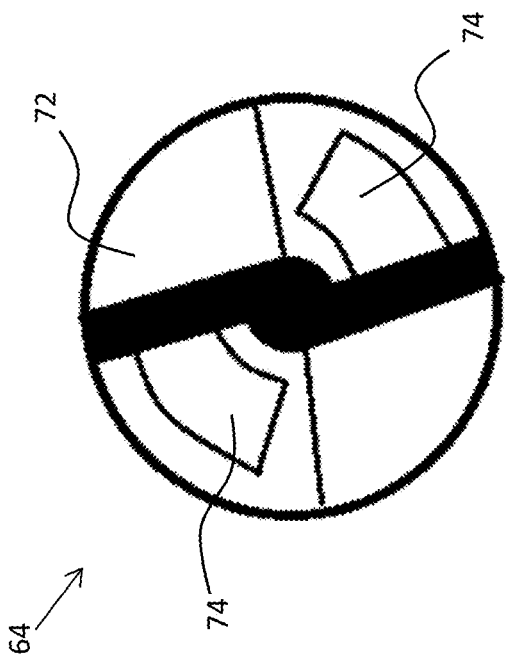
FIG. 11a is a bottom view of a brew basket of the beverage brewing apparatus when a drip stop assembly is in a first position according to an embodiment of the invention.

As best shown in FIG. 10, at least one overflow channel or orifice 66 may be formed in the brew basket 60, such as adjacent an edge 68 thereof. The overflow channel 66 is configured to drain excess water from the brew basket directly into the adjacent container. In one embodiment, the brew basket 60 includes a plurality of overflow channels 66 spaced about the periphery of the brew basket 60. In the event that an excess of water is supplied from the shower head 50 into the brew basket 60, a portion of the water will flow into the at least one overflow channel 66 to prevent the water from spilling over the edge 68 of the brew basket 60.

In one embodiment, the brew basket 60 is configured with a drip stop 70 including a movable collar 72 arranged at the outlet end 64 of the brew basket 60. The collar 72 has a specific geometric configuration and is rotatable between a first position and a second position. When the collar 72 is in the first position (FIG. 11a), the geometric configuration allows the brewed beverage to drip from at least one opening 74 formed in the outlet end 64 of the brew basket 60 into an adjacent container 80. When the collar 72 is in the second position (FIG. 11b), the geometric configuration interferes with the at least one opening 74 of the brew basket 60 to block a flow of coffee therefrom. Inclusion of the drip stop 70 temporarily stops the flow of the brewed beverage from the brew basket 60, such as to allow the container 80 within which the brewed beverage is being collected to be changed. In one embodiment, the brew chamber is capable of accumulating excess water without overflowing for at least 5 seconds when the drip stop assembly is closed.

With reference now to FIGS. 12a and 12b, an example of the shower head 50 is illustrated in more detail. The shower head 50 is configured to evenly distribute the heated water over the ground coffee arranged within the brew chamber 62 of the brew basket 60. The shower head 50 includes a substantially hollow cylindrical container having an inlet 52 fluidly connected to the heating mechanism 44 by the second conduit 48. In one embodiment, the base 54 of the shower head 50 is disposed above or within an orifice defined in a lid of the brew basket 60.

At least one distribution hole 56 is formed in a base 54 of the shower head 50 to allow the heated water to flow there through and onto the ground coffee. As shown, the shower head 50 may include a plurality of distribution holes 56, each distribution hole 56 being configured to distribute water to a desired portion of the exposed surface area of the ground coffee. The plurality of distribution holes 56 may, but need not be substantially identical in size and shape. In the illustrated, non-limiting embodiment, the plurality of distribution holes 56 is arranged about the base 54 to evenly cover a surface of the ground coffee with minimal overlap of coverage provided by adjacent distribution holes 56. In one embodiment, the shower head 50 may include eight distribution holes 56 having a diameter of 2.5 mm equally spaced at a radius of 25 mm, three distribution holes 56 having a diameter of 2.5 mm equally spaced at a radius of 8.5 mm, and a central hole having a diameter of 7 mm. In addition, the outermost ring of holes may be offset from the centerline, such as 22.5° for example. The distribution holes 56 may also include a tapered boss (not shown) configured to encourage water to flow through the distribution holes 56 in droplet formation.

The plurality of distribution holes 56 may also be positioned about the base 54 to minimize or prevent the water from directly contacting the sides of the brew basket 60 or a filter arranged within the brew basket 60. In addition, the shower head 50 may be configured to fill at least partially with water before supplying the water to the brew chamber 60 via the one or more distribution holes 56. As a result, the water within the shower head 50 is supplied to each of the distribution holes 56, and therefore the ground coffee, evenly.

Figure 4:
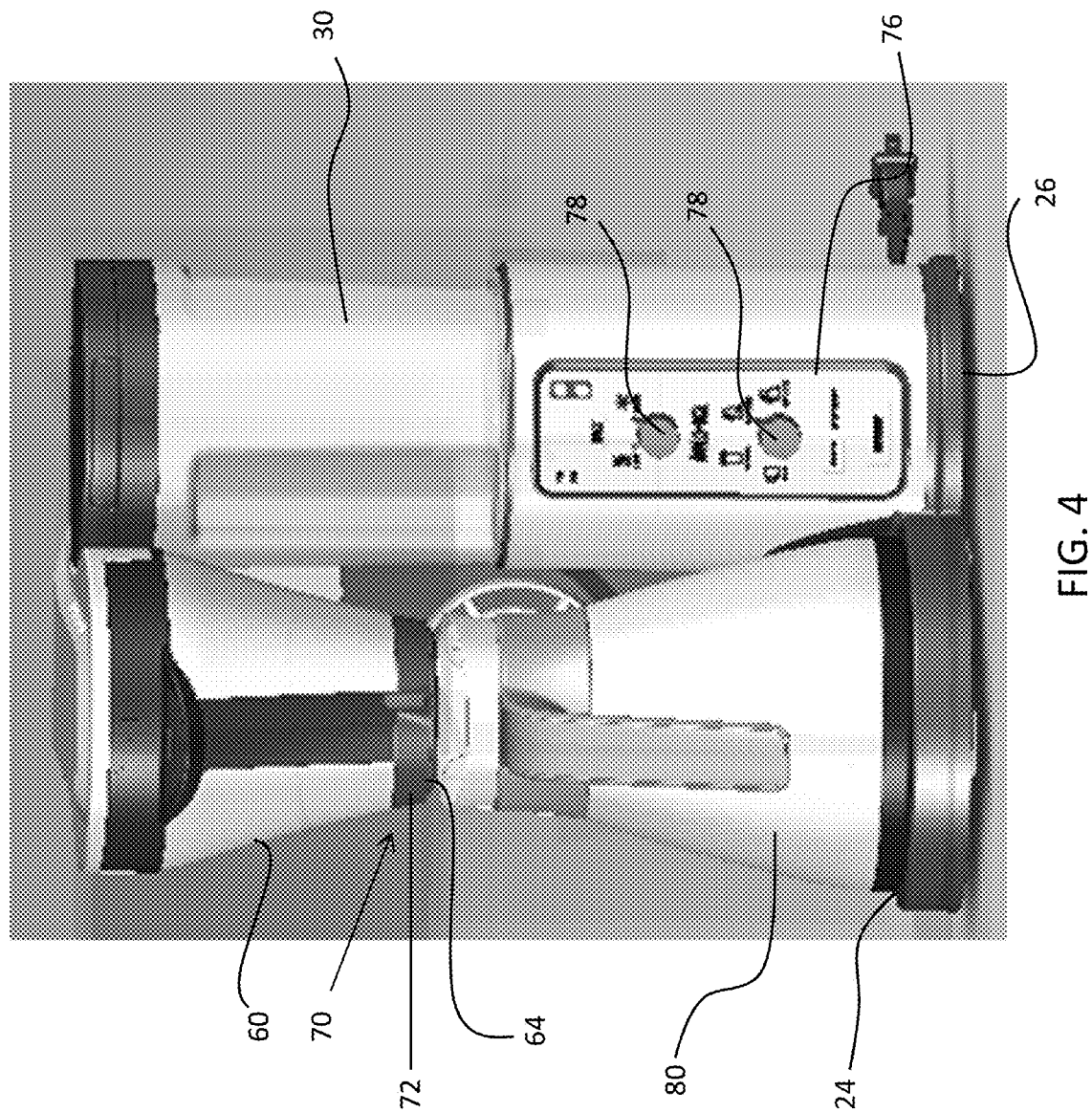
FIG. 4 is a perspective view of another beverage brewing apparatus according to an embodiment of the invention.
Figure 5:
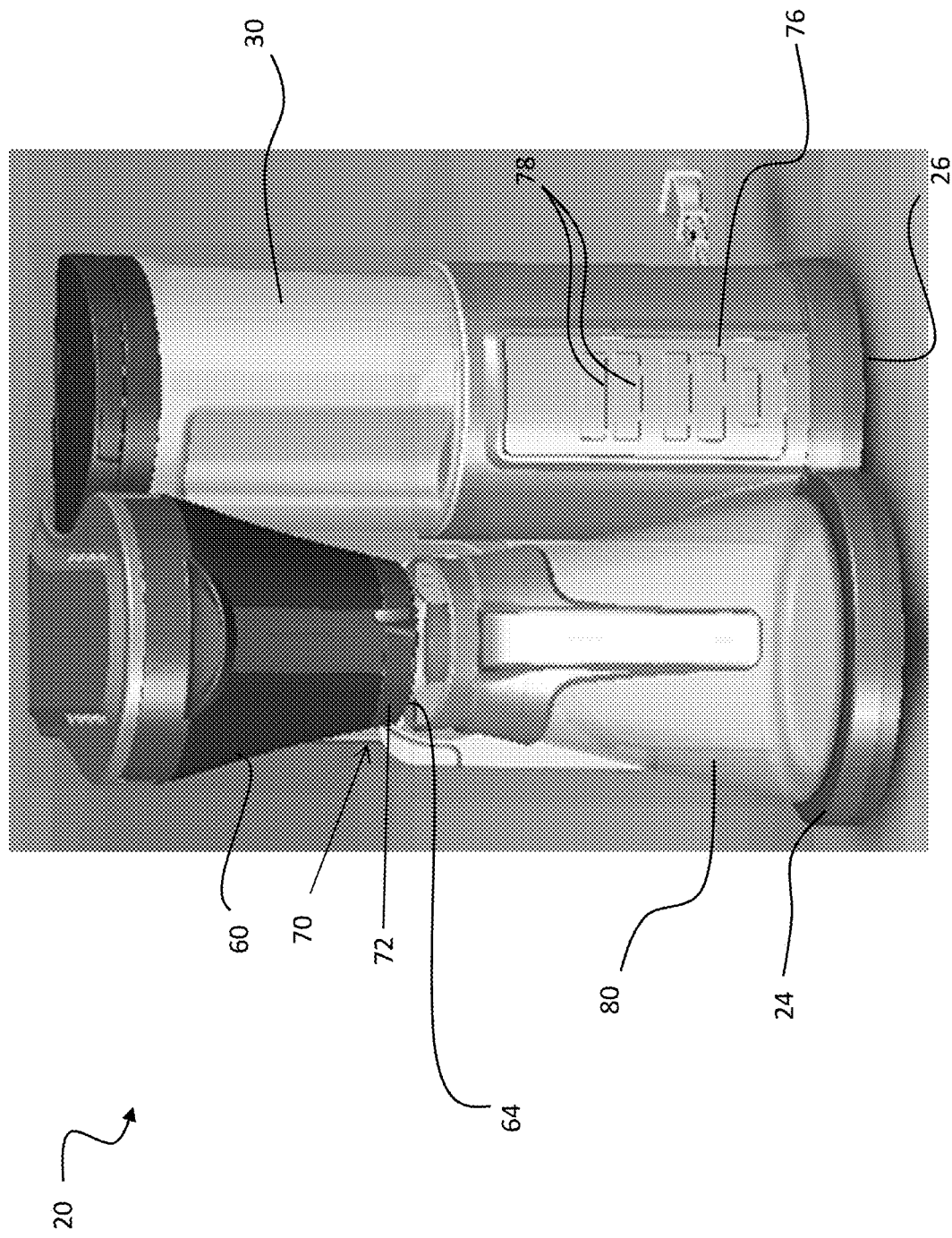
FIG. 5 is a perspective view of yet another beverage brewing apparatus according to an embodiment of the invention.
Figure 6:
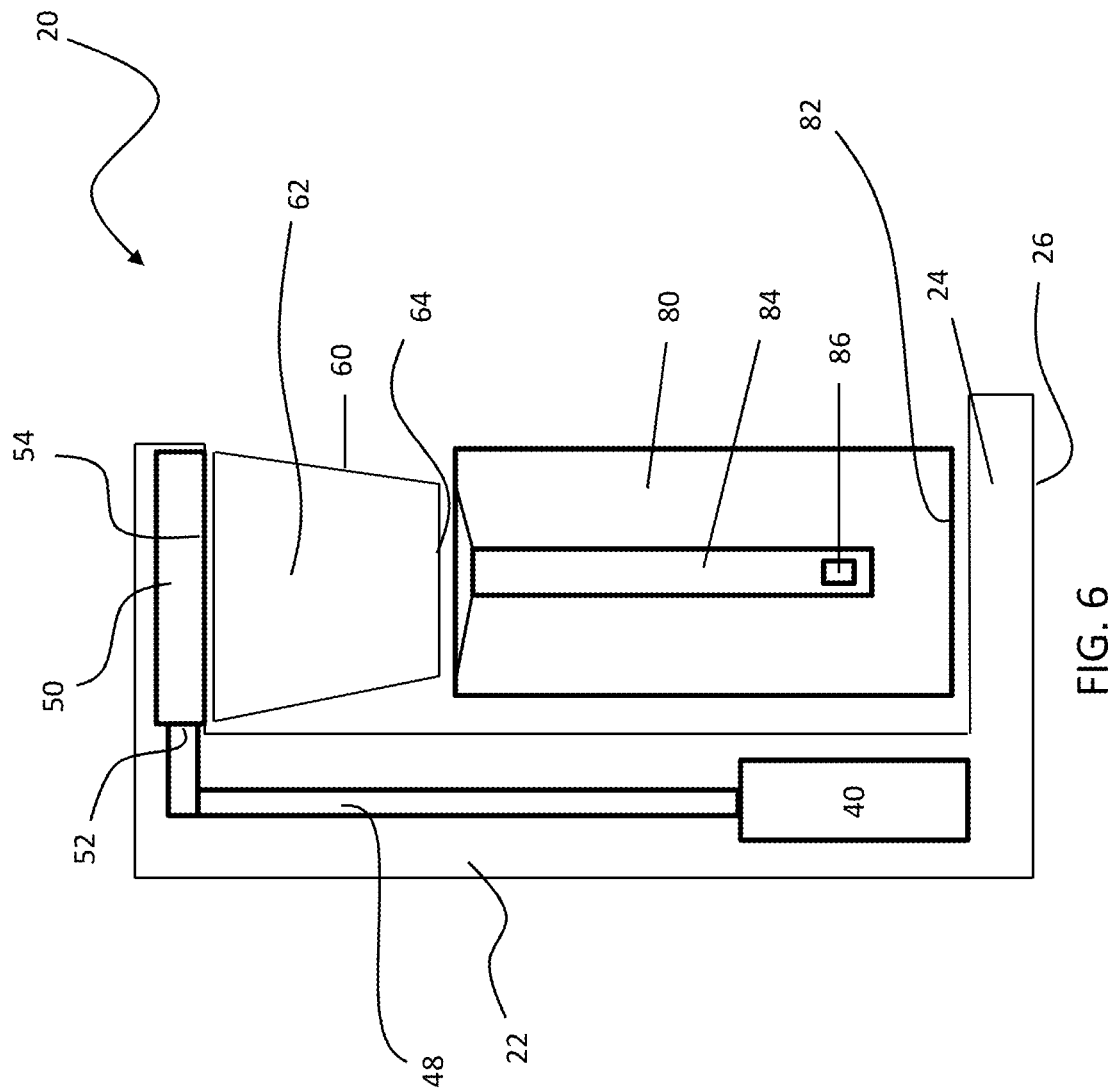
FIG. 6 is a schematic diagram of a cross-section of a beverage brewing apparatus according to an embodiment of the invention.
Figure 7:
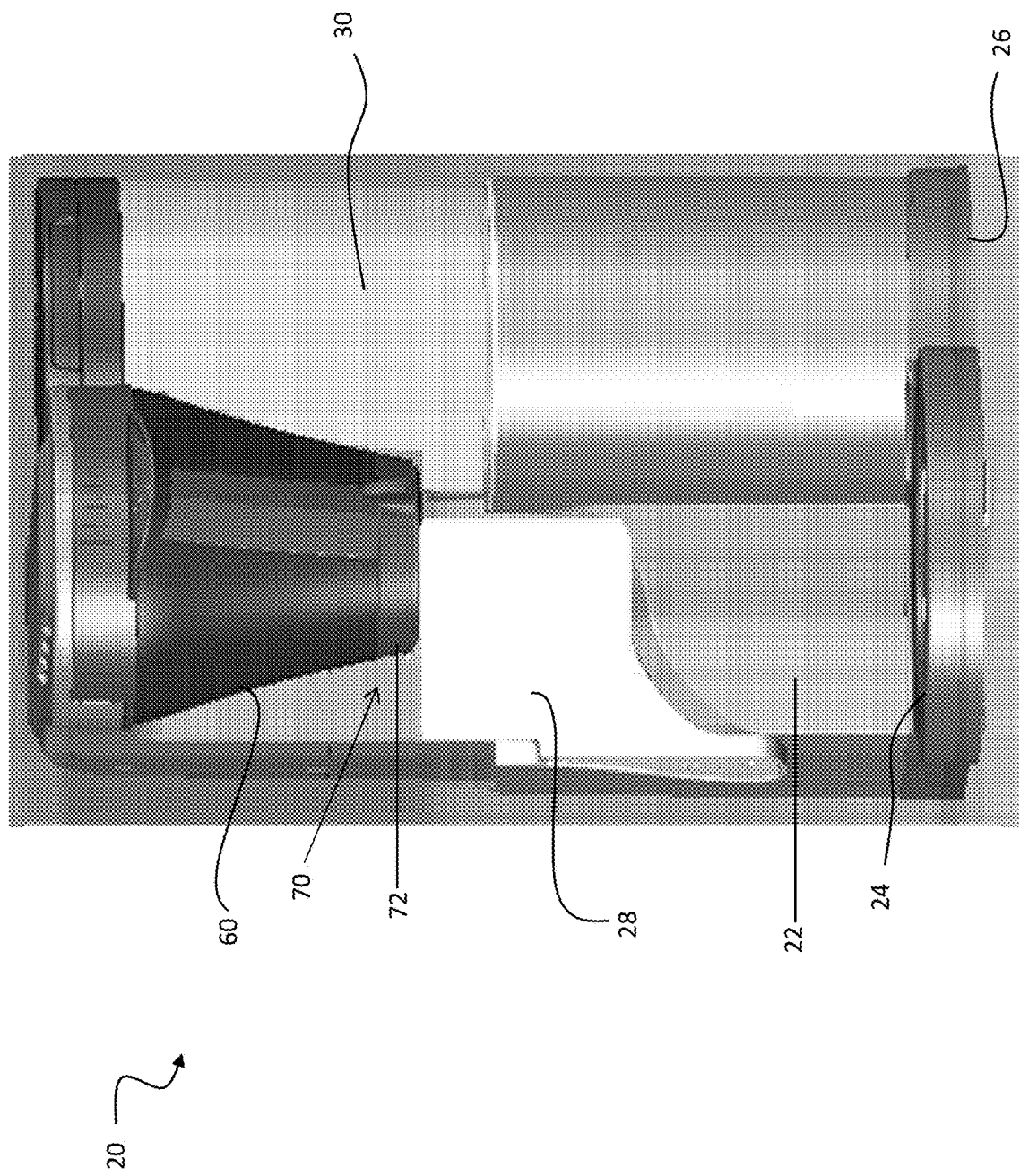
FIG. 7 is another perspective view of a beverage brewing apparatus according to an embodiment of the invention.

The apparatus 20 also includes a user interface 76, such as a panel arranged at an exterior of the housing for example. Examples of various configurations of the user interface 76 are illustrated in FIGS. 4 and 5. The user interface 76 may include one or more buttons, knobs, or other control input devices 78, such as for selecting one of a plurality of sizes of the brewed beverage. In one embodiment, the brew size may be selected from a mug (between about 6 and about 10 ounces), a travel mug (between about 12 and about 16 ounces), a half-carafe (between approximately 16 and 24 ounces), and a carafe (between about 34 and about 44 ounces). The user interface 76 additionally includes an input device 78 for selecting the type of beverage to be brewed, such as regular coffee, rich coffee, or ultra-rich coffee for example.

In the illustrated, non-limiting embodiment, the beverage brewing apparatus 20 does not include a pump configured to supply water from the water reservoir 30 to the shower head 50. Rather, pressure generated by operation of the heating mechanism 44 is used to supply a desired volume of water to the shower head 50. When the heating mechanism 44 is inactive, the level of water within the water reservoir 30 and the level of water within the second conduit 48 are generally even, or arranged within the same horizontal plane, due to pressure equalization. When the heating mechanism 44 is active, the water disposed within the heating mechanism 44 is converted to hot water and steam. As a result of this expansion, the pressure within the second conduit 48 increases and forces the expulsion of a bubbling slug of water from the heating mechanism 48, through the second conduit 48, and into the shower head 50. After delivery of the slug, additional water flows from the water reservoir 30 into the heating mechanism 44 and second conduit 48 until the pressure acting on the water is again equalized.

Operation of the beverage brewing apparatus 20 is controlled by a controller 90 operably coupled to the heating mechanism 44 and the one or more input devices 78 of the user interface 76. The controller 90 is configured to operate the heating mechanism 44 to brew a beverage in response to the input signals received from the input devices 78 indicating at least a known size and type of brewed beverage. The controller 90 may include one or more or a microprocessor, microcontroller, application specific integrated circuit (ASIC), or any other form of electronic controller known in the art.

Figure 13:
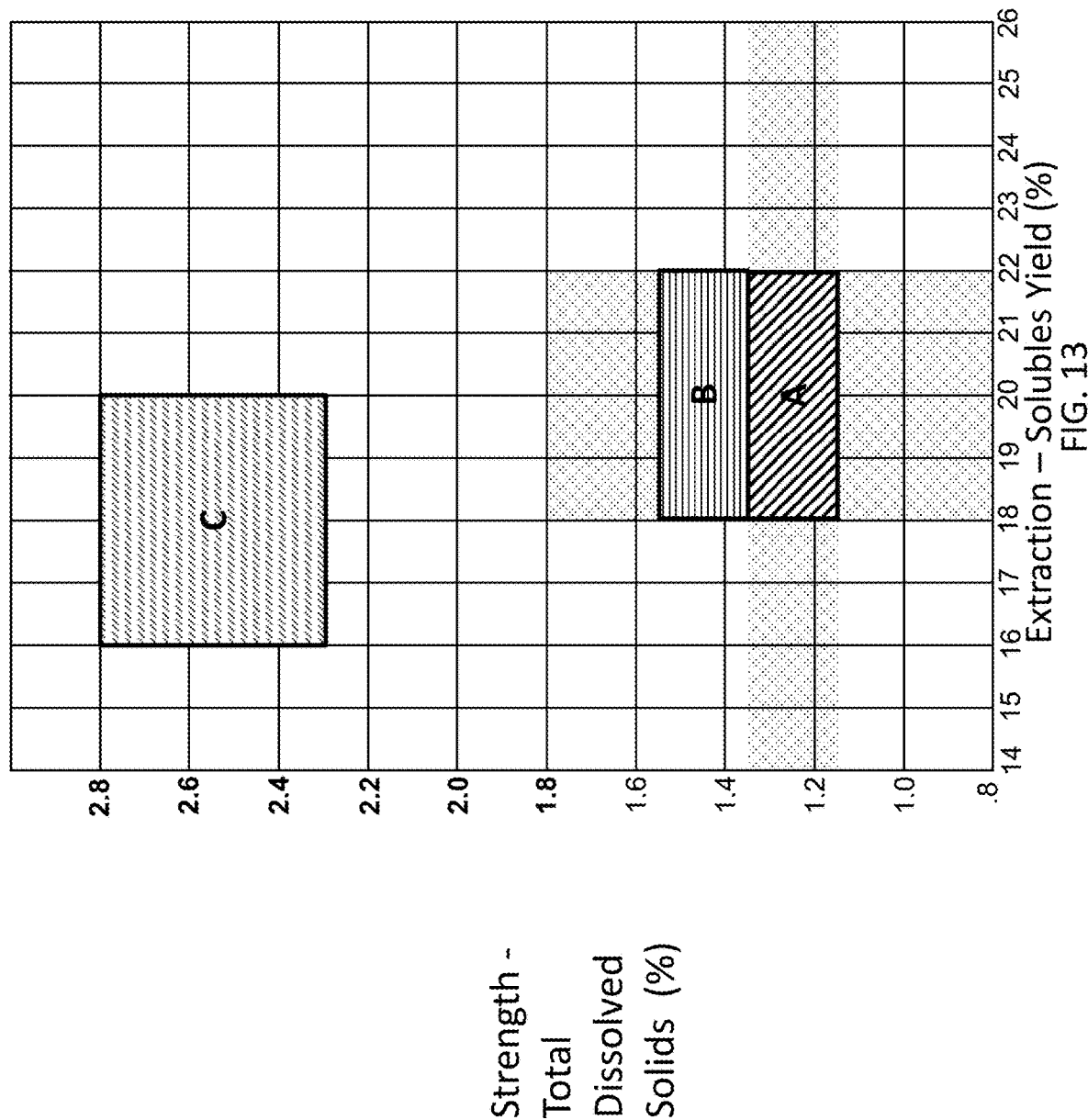
FIG. 13 a graph representing Strength (% TDS) vs. Extraction (%) of Brewed Coffee including the flavor profiles achieved by the beverage brewing apparatus according to an embodiment of the invention.

As indicated in Tables 1a-1c, parameters for brewing one or more sizes of various beverages are accessible by the controller. Based on a suggested amount of ground coffee used for each size, the parameters include an amount of bloom water, a bloom time, and an amount of brew water selected to achieve a desired flavor profile for each type of beverage. In the illustrated, non-limiting embodiment, the beverage brewing apparatus is configured to prepare any of a regular coffee, a rich coffee, and an ultra-rich coffee. With reference to FIG. 13, the parameters used to prepare a regular are intended to achieve a flavor profile having a % TDS between 1.15 and 1.35 and an extraction between about 18% and 22%. Similarly, the parameters used to prepare a rich coffee are intended to achieve a flavor profile having a % TDS between 1.35 and 1.55 and an extraction between about 18% and 22%. The flavor profiles of both the regular and rich coffees brewed by the apparatus 20 are indicated on FIG. 13, as region A and B, respectively. However, the ratio of water to ground coffee used to prepare the rich coffee may be less than used in the preparation of a regular coffee.

The parameters used to prepare an ultra-rich coffee are intended to achieve a brewed coffee flavor profile having a % TDS between 2.30 and 2.80 and an extraction between about 16% and 20%. The flavor profile of the ultra-rich coffee is indicated on FIG. 13 as region C. In one embodiment, the brewed ultra-rich coffee is configured to be received in a container filled at least partially with ice to form an iced coffee beverage. As is apparent, the flavor profile of the ultra-rich coffee is shifted diagonally relative to the profile for regular coffee to account for the dilution that occurs when ultra-rich coffee is provided to the container and dissolves at least a portion of the ice therein.

TABLE 1a

Example of Regular Coffee Parameters
REGULAR COFFEE

| Size | Ground Coffee Mass (g) | Bloom Water Volume (mL) | Bloom Duration (sec) | Total Water Volume (mL) | Target End Volume (g) |
|---|---|---|---|---|---|
| Cup | 17 | 34 | 30 | 339 | 281 |
| Travel Mug | 25.9 | 50 | 25 | 493 | 414 |
| ½ Carafe | 34 | 100 | 15 | 658 | 562 |
| Carafe | 68 | 175 | 15 | 1281 | 1123 |

TABLE 1b

Example of Rich Coffee Parameters
RICH COFFEE

| Size | Ground Coffee Mass (g) | Bloom Water Volume (mL) | Bloom Duration (sec) | Total Water Volume (mL) | Target End Volume (g) |
|---|---|---|---|---|---|
| Cup | 17 | 34 | 45 | 289 | 236 |
| Travel Mug | 25.9 | 50 | 40 | 439 | 366 |
| ½ Carafe | 34 | 100 | 30 | 582 | 491 |
| Carafe | 68 | 175 | 15 | 1149 | 985 |

TABLE 1c

Example of Ultra-Rich Parameters
ULTRA-RICH COFFEE

| Size | Ground Coffee Mass (g) | Bloom Water Volume (mL) | Bloom Duration (sec) | Total Water Volume (mL) | Target End Volume (g) |
|---|---|---|---|---|---|
| Cup | 17 | 34 | 60 | 163 | 111 |
| Travel Mug | 25.9 | 50 | 60 | 244 | 174 |
| 1/2 Carafe | 34 | 100 | 30 | 311 | 225 |
| Carafe | 68 | 175 | 15 | 621 | 468 |

In one embodiment, the recommended mass of ground coffee and volume of bloom water used generally remains constant for each brew size, regardless of which type of beverage is being prepared. For example, to prepare a cup or mug brew size of any of regular coffee, rich coffee, or ultra-rich coffee, between about 14-20 g of ground coffee and between about 28-41 mL of bloom water is recommended to achieve a beverage having a flavor profile within region A, B, or C, respectively. Use of about 20-30 g of ground coffee and 40-60 mL of bloom water are suggested to prepare travel mug brew size of any of regular coffee, rich coffee, or ultra-rich coffee. Similarly, to achieve a half carafe brew size of regular coffee, rich coffee, or ultra-rich coffee having a desired flavor profile, between about 27-41 g of ground coffee and about 80-120 mL of bloom water are recommended. Preparation of a carafe brew size of regular coffee, rich coffee, or ultra-rich coffee includes between about 54-82 g of ground coffee and between about 140-210 mL of bloom water.

The bloom time of a regular coffee of any size may be between about 12-36 seconds, the bloom time of a rich coffee of any size may be between about 12-54 seconds, and the bloom time of an ultra-rich coffee of any size may be between about 12-72 seconds. However, the bloom time, volume of brew water, and target end volume generally varies, not only based on the brew size selected, but also the beverage being prepared. A mug size portion of regular coffee has a recommended bloom time between about 24-36 seconds, a brew water volume between about 270-400 mL, and a target end volume between about 225-337 mL to achieve a flavor profile within region A. A mug size portion of rich coffee has a recommended bloom time between about 36-54 seconds, a brew water volume between about 235-345 mL, and a target end volume between about 189-283 mL to achieve a flavor profile within region B. Similarly, a mug size portion of ultra-rich coffee has a recommended bloom time between 48-72 seconds, a brew water volume between 130-196 mL, and a target end volume between about 89-133 mL to achieve a flavor profile within region C.

Similarly, preparation of a travel mug portion of regular coffee has a recommended bloom time between about 20-30 seconds, a brew water volume between about 395-591 mL, and a target end volume between about 331-497 mL to achieve a flavor profile within region A. A travel mug portion of rich coffee has a recommended bloom time between about 32-48 seconds, a brew water volume between about 351-527 mL, and a target end volume between about 293-439 mL to achieve a flavor profile within region B. Similarly, a travel mug portion of ultra-rich coffee has a recommended bloom time between about 48-72 seconds, a brew water volume between 195-293 mL, and a target end volume between about 139-209 mL to achieve a flavor profile within region C.

Preparation of a half carafe of regular coffee has a recommended bloom time between about 12-18 seconds, a brew water volume between about 526-790 mL, and a target end volume between about 465-674 mL to achieve a flavor profile within region A. A half carafe of rich coffee has a recommended bloom time between about 24-36 seconds, a brew water volume between about 458-698 mL, and a target end volume between about 393-589 mL to achieve a flavor profile within region B. Similarly, a half carafe of ultra-rich coffee has a recommended bloom time between 24-36 seconds, a brew water volume between 249-373 mL, and a target end volume between about 180-270 mL to achieve a flavor profile within region C.

Lastly, preparation of a carafe of regular coffee includes a recommended bloom time between about 12-18 sec, a brew water volume between about 1025-1537 mL, and a target end volume between about 898-1348 mL to achieve a flavor profile within region A. Recommendations for preparing a rich coffee include a bloom time between about 12-18 seconds, a brew water volume between about 919-1379 mL, and a target end volume between about 788-984 mL to achieve a flavor profile within region B. Similarly, a carafe of ultra-rich coffee has a recommended bloom time between 12-18 seconds, a brew water volume between 496-745 mL, and a target end volume between about 374-562 mL to achieve a flavor profile within region C.

Figure 2:
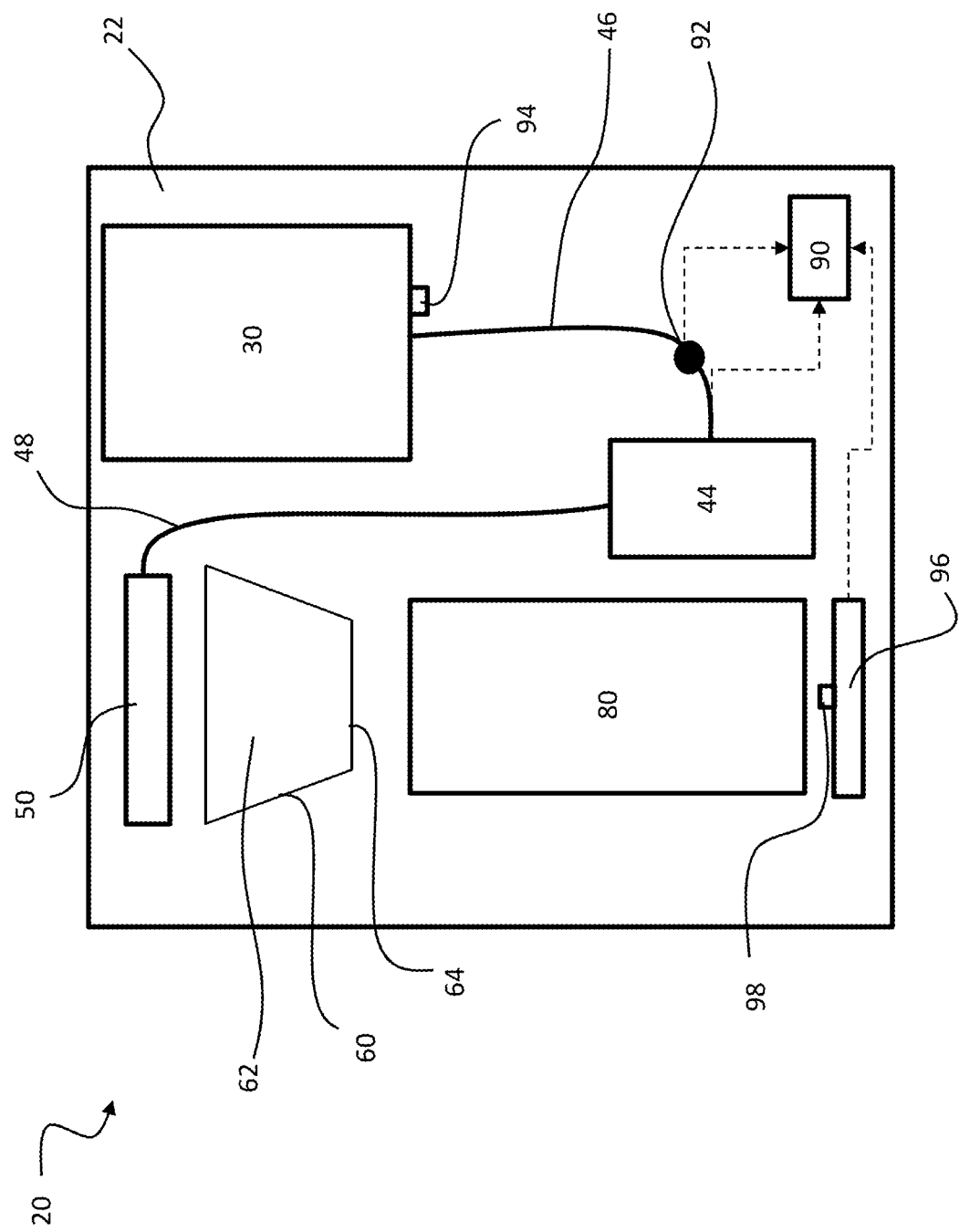
FIG. 2 is a schematic diagram of a beverage brewing apparatus according to an embodiment of the invention.
Figure 3:
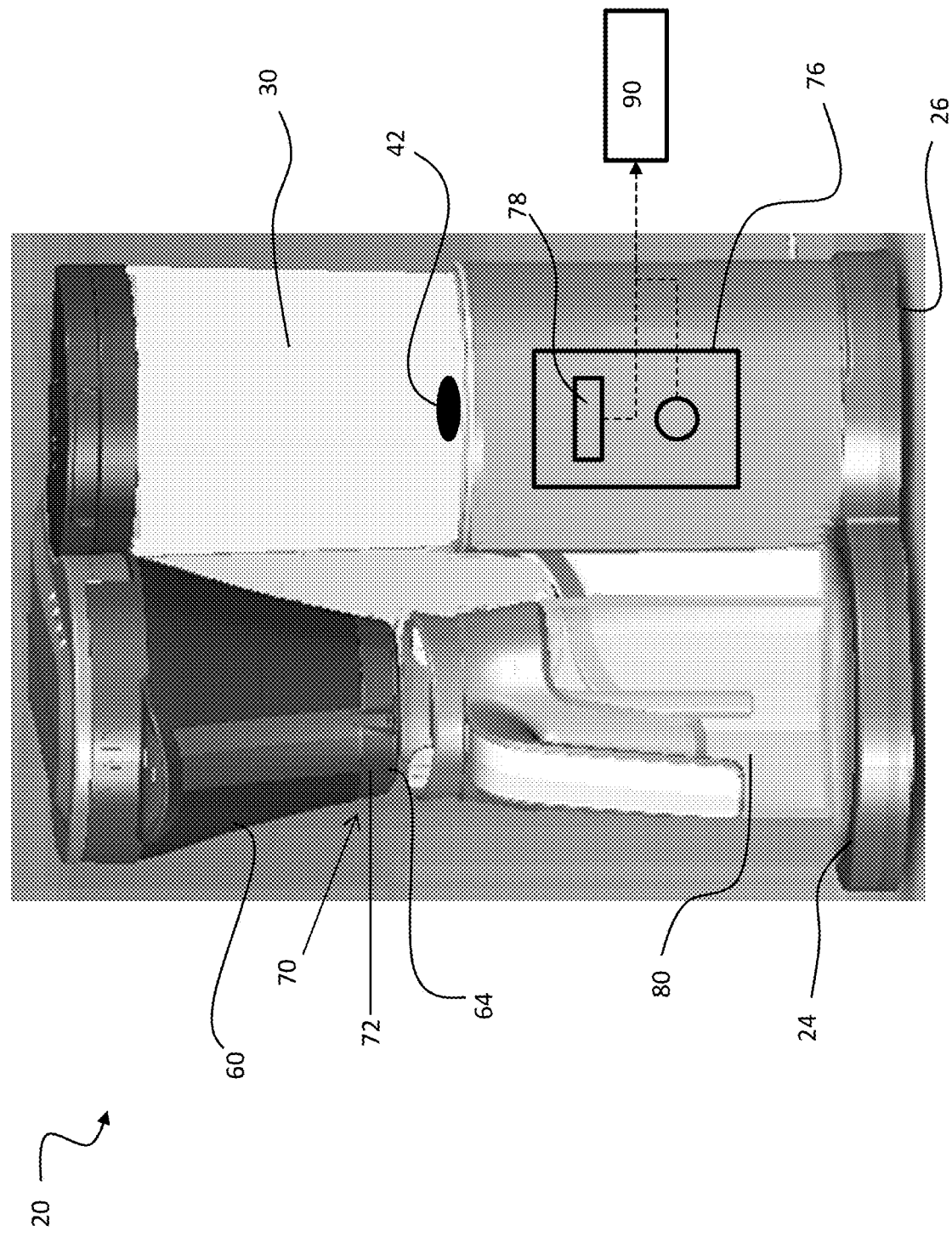
FIG. 3 is a perspective view of a beverage brewing apparatus according to an embodiment of the invention.

Various methods exist for controlling the amount of water supplied to the ground coffee as either bloom water or brew water. In one embodiment, as illustrated in FIG. 2, a flow meter 92 is arranged within the first conduit 46 extending between the water reservoir 30 and the heating mechanism 44. The flow meter 92 is operably coupled to the controller 90 and is configured to monitor an amount of water passing there through. Due to the equalized pressure within the fluid system, the amount of water that passes through the flow meter 92 is generally indicative of the amount of water provided to the shower head 50. In embodiments where the flow meter 92 is a paddle wheel, each rotation of the wheel sends a signal to the controller 90 indicating that a known amount of water has passed through the flow meter 92. Once a predetermined volume of water has passed through the flow meter 92, the controller 90 turns off the heating mechanism 44 to limit further flow of the water to the shower head 50.

Figure 15:
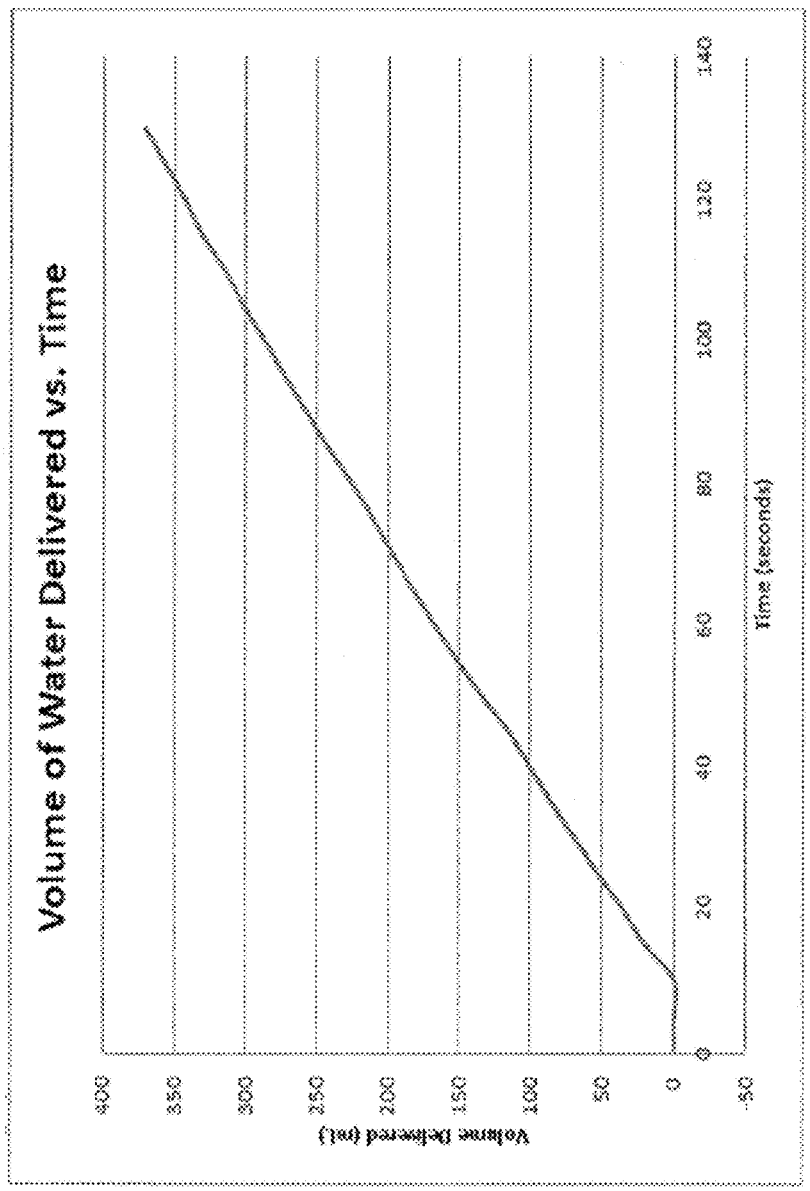
FIG. 15 is a graph representing the volume of water delivered vs. time.

In another embodiment, the amount of water supplied to the shower head 50 is monitored by an algorithm stored within the controller 90. The algorithm is a function of the delivery rate of a cool temperature water to the shower head and the amount of time since the heating mechanism 44 was last used. As illustrated in FIG. 15, the graph representing the volume of water delivered vs. time includes an initial "warm-up" period where power is applied to the heating mechanism 44, but no water is delivered to the shower head 50. Only once the delivery of the water to the shower head 50 is initiated does the graph become linear. The slope of the line varies based on the temperature of the water. The volume delivered at any given time period can be represented by the equation:

$$Vol = rate*(time - warm\ up\ time)$$

Figure 16:
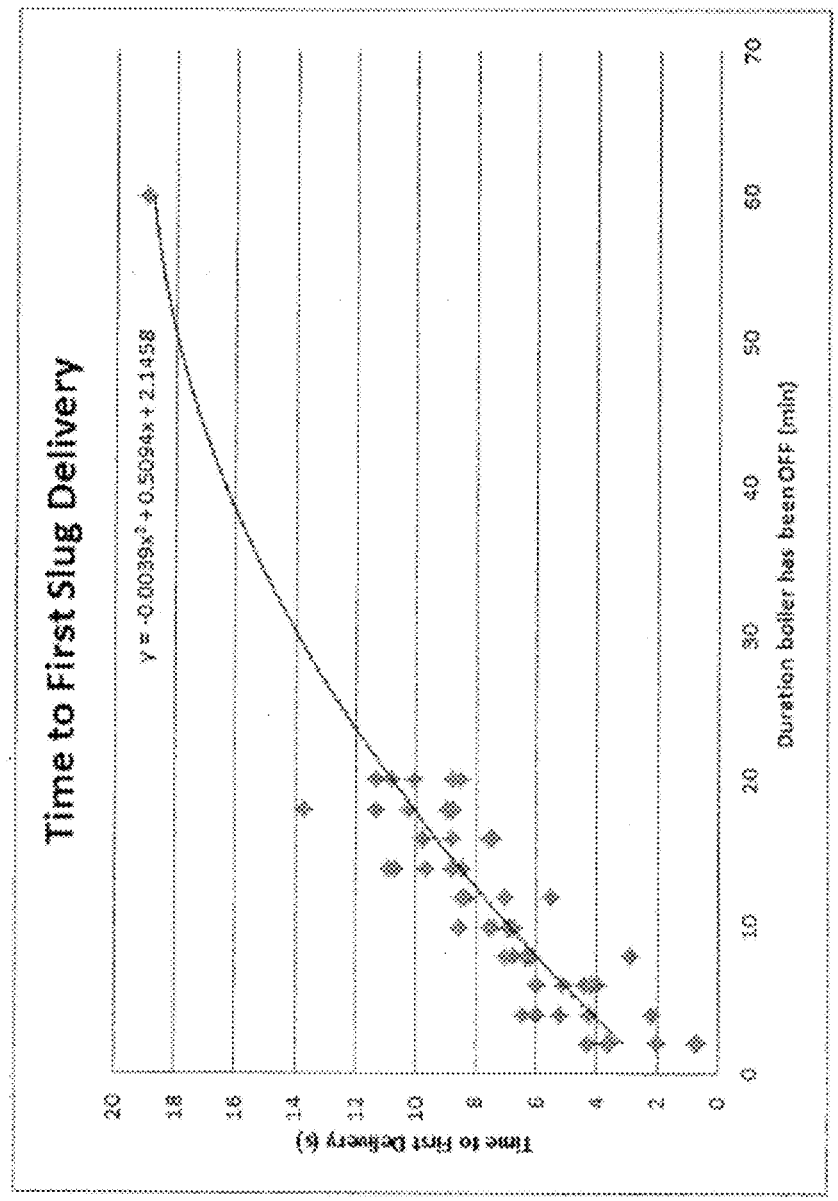
FIG. 16 is a graph representing the warm-up period of the heating mechanism as a function of time elapsed since operation of the heating mechanism.

The warm up period is directly influenced by the time since the heating mechanism 44 was last energized. FIG. 16 illustrates the warm-up period of the heating mechanism 44 as a function of the time elapsed since operation of the heating mechanism 44.

As shown, as the temperature of the heating mechanism 44 reaches ambient conditions, the time required to warm-up the heating mechanism 44 will asymptotically approach its limit. In the illustrated, non-limiting embodiment, FIG. 16 is based on the assumption that the temperature of the heating mechanism 44 will equal the ambient temperature for any elapsed time greater than or equal to one hour. The time required to warm-up the heating mechanism 44 may also vary based on the temperature of the water. In one embodiment, the apparatus 20 may include a thermistor or other sensor configured to monitor the temperature of the water. In such instances, the algorithm may be adapted to account for water temperature to more accurately determine a length of time for which the heating mechanism 44 should be energized to supply a desired amount of water to the shower head 50.

Alternatively, a temperature sensor (not shown), such as a negative temperature coefficient thermistor for example, may be configured to monitor a temperature of the heating element. The temperature sensor is operably coupled to the controller such that the controller continuously monitors a temperature of the heating mechanism. The controller compares a value recorded by the temperature sensor with a stored reference value to determine a state of the heating mechanism. When the value recorded by the temperature sensor reaches a predetermined threshold, it can be determined that the warm-up of the heating mechanism 44 is complete.

Figure 14:
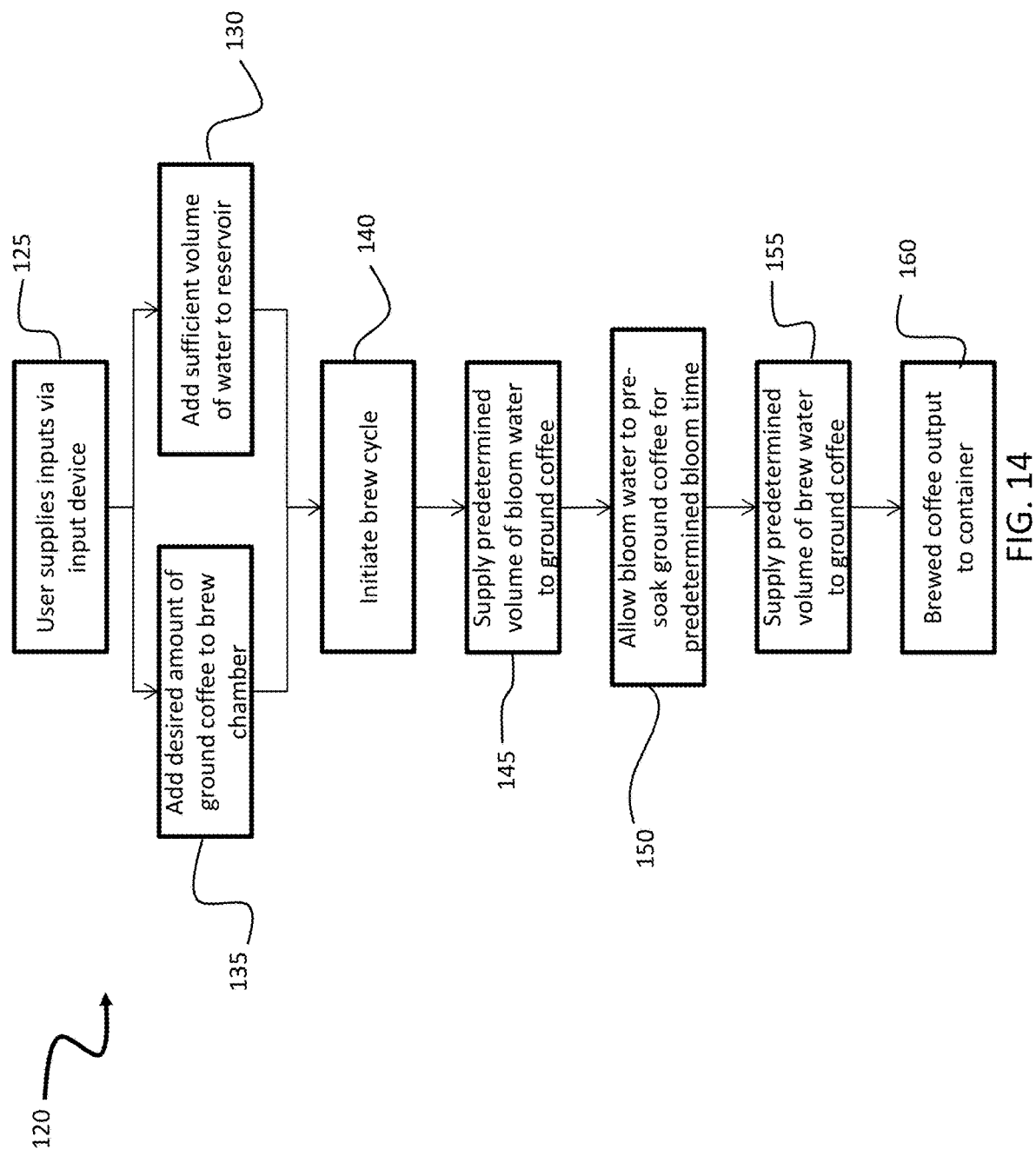
FIG. 14 is a flow chart of a method of preparing a brewed beverage using the beverage brewing apparatus according to an embodiment of the invention.

A method 120 of brewing a beverage using the beverage brewing apparatus 20 is illustrated in the flowchart of FIG. 14. In operation, a user selects a brew size and a type of beverage to be brewed by the apparatus, for example using the one or more input devices 78, as shown in block 125. In block 130, the user adds a sufficient amount of water to the water reservoir 30 to brew a beverage of the selected size. Similarly, in block 135, the user additionally adds ground coffee to the brew chamber 62 of the brew basket 60 in an amount appropriate for the selected brew size. In one embodiment, the brew basket 60, or the filter arranged therein, may include one or more markings 65 (see FIG. 10), such as formed on an exterior surface thereof or within the brew chamber 62 for example, indicating a suggested amount of ground coffee appropriate for one or more of the selectable brew sizes. In other embodiments, the apparatus 20 may be configured to automatically add water to the water reservoir 30 and/or ground coffee to the brew basket 60 from sources of water and ground coffee, respectively.

In one embodiment, a sensor 94 (see FIG. 2) is operably coupled to the controller 90 and configured to detect the presence of water in the reservoir 30. An example of the sensor 94 may include two conductive pins mounted near the outlet end 38 of the reservoir 30 adjacent the input tube 46. A circuit between the pins is shorted when water is present within the reservoir 30. If the sensor 94 generates a signal indicating that there is no water within the reservoir 30, the controller 90 will either cease operation of the heating mechanism 44 or will not energize the heating mechanism 44.

In block 140, after an appropriate amount of water and ground coffee has been added to the apparatus 20, the user may initiate the brewing process, such as via an input device 78 for example. Alternatively, the apparatus 20 may be configured to automatically begin brewing a beverage in response to a signal from a timer or other programming device. Water within the heating mechanism 44 is heated to a desired temperature. The heated water and steam generated builds up a pressure within the heating mechanism 44 such that a first portion of the water, used as the bloom water, is supplied through the second conduit 48 to the shower head 50 where it is distributed onto the ground coffee in the brew chamber 62, as shown in block 145. The volume of bloom water supplied to the ground coffee is a predetermined amount that varies based on the selected brew size and the type of beverage being brewed. The amount of bloom water supplied to the ground coffee is sufficient to moisten a portion or all of the ground coffee in the brew chamber 62, but insufficient to cause a significant amount of, or any, water to exit into the container 80.

The bloom water pre-soaks the ground coffee for a predetermined period of time, as shown in block 150. The bloom time is also variable based on the selected brew size and the type of beverage being brewed. After allowing the bloom water to pre-soak the ground coffee for the bloom time, as shown in block 155, the controller 90 again energizes the heating mechanism 44 to heat and direct a volume of brew water to the brew chamber 62. In block 160, the heated brew water enters the brew chamber 62 to produce coffee which is directed through the ground coffee and into the container 80, thereby completing the brew cycle.

A heater plate 96, shown in FIG. 2, may be positioned within the housing 22, such as directly adjacent the floor 24 for example. The heater plate 96 is operably coupled to the controller 90 and may be configured to selectively heat a brewed beverage stored within a container 80 located on the floor 24. To prevent the heat supplied by the heater plate 96 from negatively affecting the flavor of the brewed beverage, such as by breaking down the fats within the coffee for example, a thermal regulation device 98 may be configured to monitor the temperature of the container 80 and/or the brewed beverage. In one embodiment, the thermal regulation device 98 is a thermostat configured to automatically block power to the heater plate 96 when the container 80 exceeds a predetermined temperature. In another embodiment, the thermal regulation device 98 is a thermistor coupled to the controller 90. In such embodiments, if the resistance of the thermistor surpasses a predetermined value, thereby indicating that the temperature of the container 80 is greater than a desired temperature, the controller 90 will remove power from the heater plate 96.

By allowing the controller 90 to vary the parameters for a brewed beverage based on the volume and the type of beverage being brewed, the apparatus 20 is configured to prepare a plurality of brewed beverages, each having an optimized flavor profile. As a result of this customization, more pleasant tasting beverages may be achieved.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An automated beverage brewing apparatus, comprising:
   a user interface; and
   a controller for identifying a volume of bloom water and a bloom time for preparing a brewed beverage based on at least one input received from the user interface, the controller being configured to vary the volume of bloom water and automatically vary the bloom time based on at least one of a type of brewed beverage and a size of brewed beverage input via the user interface, the controller comprising
      a microprocessor in communication with the user interface, the microprocessor operable to retrieve a plurality of stored parameters associated with the size and the beverage type and to initiate preparation of the brewed beverage using the plurality of stored parameters, wherein the bloom time is determined using the plurality of stored parameters.

2. The apparatus of claim 1, further comprising:
   a reservoir configured to hold a volume of water sufficient to prepare the brewed beverage;
   a receptacle configured to hold ground coffee; and
   a heating mechanism arranged in fluid communication with an outlet of the reservoir, the heating mechanism being in communication with the controller and being configured to heat water delivered from the reservoir to the heating mechanism before supplying it to the receptacle.

3. The apparatus of claim 2, wherein the controller is operably coupled to the heating mechanism and is configured to operate the heating mechanism to control the volume of water provided to the receptacle.

4. The apparatus of claim 2, further comprising a flow meter operably coupled to the controller.

5. The apparatus of claim 4, wherein the flow meter is a paddle wheel and is configured to provide a signal to the controller indicative of an amount of water passing through the flow meter responsive to a rotation of the paddle wheel.

6. The apparatus of claim 2, wherein the automated beverage brewing apparatus is configured to automatically add water to the reservoir from a water source.

7. The apparatus of claim 1, wherein the automated beverage brewing apparatus is configured to automatically add ground coffee to the receptacle from a source of ground coffee.

8. The apparatus of claim 1, wherein the controller is configured to vary the bloom time based on the type of brewed beverage and the size of brewed beverage input via the user interface.

9. The apparatus of claim 1, further comprising a heater plate coupled to the controller and a thermal regulation device coupled to the heater plate, the thermal regulation device configured to monitor a temperature of the brewed beverage or a container containing the brewed beverage in contact with the thermal regulation device.

10. The apparatus of claim 1, wherein the user interface is configured to receive a user input identifying the size of the brewed beverage selected from a group consisting of a mug, a travel mug, a half-carafe, and a carafe.

11. The apparatus of claim 1, wherein the automated beverage brewing apparatus is configured to prepare at least one of a regular coffee, a rich coffee, and an ultra-rich coffee.

12. The apparatus of claim 1, wherein the user interface is configured to receive a user input selecting the type of brewed beverage from a plurality of brewed beverage types and the size of the brewed beverage from a plurality of brewed beverage sizes.

13. The apparatus of claim 12, wherein the controller is configured to determine the plurality of stored parameters for preparing the brewed beverage based on the user input, wherein the volume of bloom water of a first brewed beverage is greater than the volume of bloom water of a second brewed beverage for each of the plurality of sizes selectable by a user, the first brewed beverage having a first flavor profile and the second brewed beverage having a second flavor profile.

14. The apparatus of claim 13, wherein the beverage brewing apparatus is configured to prepare a third brewed beverage having a third flavor profile, the volume of bloom water of the third brewed beverage being less than the volume of bloom water of the second brewed beverage for each of the plurality of sizes selectable by a user.

15. The apparatus of claim 14, wherein the first flavor profile of the first brewed beverage includes a percent of total dissolved solids between about 1.15 and about 1.35 and an extraction between about 18% and about 22%, the second flavor profile of the second brewed beverage includes a percent of total dissolved solids between 1.35 and 1.55 and an extraction between 18% and 22%, and the third flavor profiled of the third brewed beverage includes a percent of total dissolved solids between 2.30 and 2.80 and an extraction between 16% and 20%.

16. The apparatus of claim 13, wherein the stored parameters for preparing each brewed beverage of the plurality of brewed beverages include a recommended mass of ground coffee and the volume of bloom water, wherein each of the recommended mass of ground coffee and the volume of bloom water are identical for a selected size, regardless of which of the plurality of brewed beverages is selected.

17. The apparatus of claim 16, wherein the brewed beverage is a regular coffee and the stored parameters for preparing a regular coffee of a first size define the mass of ground coffee to be between about 14-20 g, the volume of bloom water to be between about 28-41 mL, the bloom time to be between about 15-30 seconds, and a volume of brew water to be between about 270-400 mL.

18. The apparatus of claim 16, wherein the brewed beverage is a rich coffee and the stored parameters for preparing a rich coffee of a first size define the mass of ground coffee to be between about 14-20 g, the volume of bloom water to be between about 28-41 mL, the bloom time to be between about 30-50 seconds, and a volume of brew water to be between about 235-345 mL.

19. The apparatus of claim 16, wherein the brewed beverage is an ultra-rich coffee and the stored parameters for preparing an ultra-rich coffee of a first size define the mass of ground coffee to be between about 14-20 g, the volume of bloom water to be between about 28-41 mL, the bloom time to be between about 30-60 seconds, and a volume of brew water to be between about 89-133 mL.

* * * * *